(12) United States Patent
Hu et al.

(10) Patent No.: US 9,785,570 B2
(45) Date of Patent: Oct. 10, 2017

(54) MEMORY DEVICES AND MODULES

(71) Applicant: Samsung Electronics Co., Ltd., Suwon-si, Gyeonggi-do (KR)

(72) Inventors: Chaohong Hu, San Jose, CA (US); Hongzhong Zheng, Sunnyvale, CA (US); Dimin Niu, Sunnyvale, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 64 days.

(21) Appl. No.: 14/863,446

(22) Filed: Sep. 23, 2015

(65) Prior Publication Data

US 2016/0266975 A1  Sep. 15, 2016

Related U.S. Application Data

(60) Provisional application No. 62/130,600, filed on Mar. 9, 2015.

(51) Int. Cl.
*G06F 11/10* (2006.01)
*G06F 12/1009* (2016.01)

(52) U.S. Cl.
CPC ...... *G06F 12/1009* (2013.01); *G06F 11/1048* (2013.01); *G06F 2212/1016* (2013.01); *G06F 2212/1032* (2013.01); *G06F 2212/65* (2013.01)

(58) Field of Classification Search
CPC .................................................. G06F 11/1076
USPC ......................................... 714/764, 766, 770
See application file for complete search history.

(56) References Cited

U.S. PATENT DOCUMENTS

| | | | |
|---|---|---|---|
| 4,570,217 A * | 2/1986 | Allen | G06F 1/14 700/83 |
| 5,737,744 A | 4/1998 | Callison et al. | |
| 6,681,284 B1 * | 1/2004 | Thomson | G06F 13/4027 710/305 |
| 7,636,833 B2 | 12/2009 | Tremaine | |
| 8,671,330 B2 | 3/2014 | Komagome | |
| 8,738,819 B2 | 5/2014 | Le et al. | |
| 9,544,976 B2 * | 1/2017 | Snyder | H05B 33/0815 |
| 2003/0123389 A1 * | 7/2003 | Russell | G06F 11/273 370/230 |
| 2015/0168156 A1 * | 6/2015 | Hsu | G01C 21/3623 701/532 |

* cited by examiner

*Primary Examiner* — Fritz Alphonse
(74) *Attorney, Agent, or Firm* — Renaissance IP Law Group LLP

(57) ABSTRACT

An embodiment includes a system, comprising: an Error Correcting Code (ECC) memory comprising a plurality of memory locations, each memory location corresponding to a device address of the ECC memory; a system management bus (SMB); a baseboard management controller (BMC) coupled to the ECC memory through the SMB; and an operating system comprising a driver module coupled to the BMC through the SMB, the driver module being configured to receive through the Memory device address information associated with the ECC memory and to convert the device address information into physical address information independent of an ECC memory controller.

20 Claims, 26 Drawing Sheets

MEMORY DEVICES AND MODULES

CROSS-REFERENCE TO RELATED APPLICATIONS

This application claims the benefit of U.S. Provisional Patent Application No. 62/130,600, filed Mar. 9, 2015, the contents of which are hereby incorporated by reference herein, in their entirety, for all purposes.

BACKGROUND

This disclosure relates to memory system architectures and, in particular, memory system architectures with error correction.

Memory controllers may be configured to perform error correction. For example, a memory controller may read 72 bits of data from a memory module in which 64 bits are data and 8 bits are parity. The memory controller may perform other error correction techniques. Using such techniques, some errors in data read from the memory module may be identified and/or corrected. In addition, the memory controller may make information related to the errors available. A system including the memory controller may make operational decisions based on the error information, such as retiring a memory page, halting the system, or the like. Such a memory controller may be integrated with a processor. For example, INTEL XEON processors may include an integrated memory controller configured to perform error correction. If, however, error correction is performed before data is received by the memory controller, the error information related to the correction may not be available in the memory controller and hence, not available to the system for system management decisions.

SUMMARY

An embodiment includes a driver module for an operating system, comprising: an interface configured to receive from a system management bus (SMB) device address information associated with an Error Correcting Code (ECC) memory, the ECC memory comprising a plurality of memory locations, each memory location corresponding to a device address of the ECC memory; and an address converter configured to convert the device address information into physical address information independent of an ECC memory controller. One exemplary embodiment comprises a device address to physical address (DA-to-PA) conversion table with which the address converter converts the device address information into physical address information. In yet another exemplary embodiment, the DA-to-PA conversion table is based on configuration information for a processing device associated with the operating system and configuration information for a Basic Input/Output System (BIOS) associated with the operating system. One exemplary embodiment provides that the ECC memory comprises a Single-Error Correcting, Double-Error Detection (SECDED) ECC memory, a single-chip Chipkill ECC memory or a double-chip Chipkill ECC memory. Another exemplary embodiment provides that the ECC memory operates in a single channel/dual asymmetric mode or a dual channel symmetric mode.

Another embodiment includes a driver module for an operating system, comprising: an interface configured to receive from a baseboard management controller (BMC) device address information associated with an Error Correcting Code (ECC) memory, the ECC memory comprising a plurality of memory locations, each memory location corresponding to a device address of the ECC memory; an address converter configured to convert the device address information into physical address information independent of an ECC memory controller, the driver module sending the physical address information of a converted device address to a kernel of the operating system. In one exemplary embodiment, the address converter uses a device address to physical address (DA-to-PA) conversion table to convert the device address information associated with the ECC memory into physical address information. One exemplary embodiment provides that the ECC memory comprises a Single-Error Correcting, Double-Error Detection (SECDED) ECC memory, a single-chip Chipkill ECC memory or a double-chip Chipkill ECC memory. Another exemplary embodiment provides that the ECC memory operates in a single channel/dual asymmetric mode or a dual channel symmetric mode.

Another embodiment includes a method to convert devices addresses to physical addresses in a memory system in which the method comprises: receiving at a driver module of an operation system kernel device address information for an Error Correction Code (ECC) memory from a system management bus (SMB), the ECC memory comprising a plurality of memory locations, and each memory location corresponding to a device address of the ECC memory; converting at the driver module the device address information into physical address information; and sending the physical address information to the operating system kernel. In one exemplary embodiment, the driver module comprises a device address to physical address (DA-to-PA) conversion table, and converting the device address information into physical address information comprises reading the physical address information from the DA-to-PA conversion table for the received device address information. One exemplary embodiment provides that the ECC memory comprises a Single-Error Correcting, Double-Error Detection (SECDED) ECC memory, a single-chip Chipkill ECC memory or a double-chip Chipkill ECC memory. Another exemplary embodiment provides that the ECC memory operates in a single channel/dual asymmetric mode or a dual channel symmetric mode.

DETAILED DESCRIPTION

Figure 1:
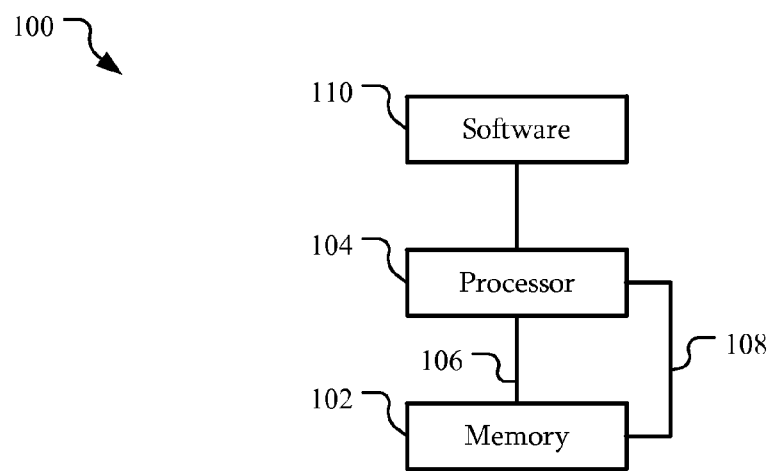
FIG. 1 is a schematic view of a system with a memory system architecture according to an embodiment.

The embodiments relate to memory system architectures. The following description is presented to enable one of ordinary skill in the art to make and use the embodiments and is provided in the context of a patent application and its requirements. Various modifications to the embodiments and the generic principles and features described herein will be readily apparent. The embodiments are mainly described in terms of particular methods and systems provided in particular implementations.

The methods and systems, however, will operate effectively in other implementations. Phrases such as "an embodiment," "one embodiment" and "another embodiment" may refer to the same or different embodiments as well as to multiple embodiments. The embodiments will be described with respect to systems and/or devices having certain components. The systems and/or devices, however, may include more or less components than those shown, and variations in the arrangement and type of the components may be made without departing from the scope of this disclosure. The embodiments will also be described in the context of particular methods having certain steps. The method and system, however, operate according to other methods having different and/or additional steps and steps in different orders that are not inconsistent with the embodiments. Thus, embodiments are not intended to be limited to the particular embodiments shown, but are to be accorded the widest scope consistent with the principles and features described herein.

The embodiments are described in the context of particular memory system architecture having certain components. One of ordinary skill in the art will readily recognize that embodiments are consistent with the use of memory system architectures having other and/or additional components and/or other features. One of ordinary skill in the art, however, will readily recognize that the method and system are consistent with other structures. Methods and systems may also be described in the context of single elements. One of ordinary skill in the art, however, will readily recognize that the methods and systems are consistent with the use of memory system architectures having multiple elements.

It will be understood by those skilled in the art that, in general, terms used herein, and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. The use of such phrases, however, should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Furthermore, in those instances where a convention analogous to "at least one of A, B, or C, etc." is used, in general such a construction is intended in the sense one having skill in the art would understand the convention (e.g., "a system having at least one of A, B, or C" would include, but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As used herein, the word "exemplary" means "serving as an example, instance, or illustration." Any embodiment described herein as "exemplary" is not to be construed as necessarily preferred or advantageous over other embodiments. The subject matter disclosed herein may, however, be embodied in many different forms and should not be construed as limited to the exemplary embodiments set forth herein. Rather, the exemplary embodiments are provided so that this description will be thorough and complete, and will fully convey the scope of the claimed subject matter to those skilled in the art.

As used herein, the term "module" refers to any combination of software, firmware and/or hardware configured to provide the functionality described herein. The software may be embodied as a software package, code and/or instruction set or instructions, and "hardware," as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

FIG. 1 is a schematic view of a system with a memory system architecture according to an embodiment. The system 100 includes a memory 102 coupled to a processor 104. The memory 102 is configured to store data. When data is read from the memory 102, the memory 102 is configured to correct an error, if any, in the data. For example, the memory 102 may be configured to correct a single-bit error. The memory 102 may also be configured to detect a double-bit error. Although the particular number of errors corrected has been used as an example, the memory 120 may be configured to correct any number of errors or detect any number of errors. Moreover, although one or more error correction techniques may result in single-bit error correction and/or double-bit error detection, the memory 102 may be configured to perform any error correction technique that can correct at least one error.

The memory 102 may include any device that is configured to store data. In a particular example, the memory 102 may be a dynamic random access memory (DRAM) module. The memory 102 may include a double data rate synchronous dynamic random access memory (DDR SDRAM) according to various standards, such as DDR, DDR2, DDR3, DDR4, or the like. In other embodiments, the memory 102 may include static random access memory (SRAM), non-volatile memory, or the like.

The memory 102 is configured to generate error information in response to correcting an error and/or attempting to correct an error in the data read from stored data. For example, the error information may include information about a corrected error, an uncorrected error, an absence of an error, a number of such errors, or the like. Error information may include the actual error, an address of the error, number of times the error has occurred, or other information specific to the memory 102. In a particular example, the error information may include information about a single-bit error indicating that the memory 102 corrected the single-bit error. Although particular examples of error information have been described, the error information may include any information related to errors.

The processor 104 may be any device configured to be operatively coupled to the memory 102 and capable of executing instructions. For example, the processor 104 may be a general-purpose processor, a digital signal processor (DSP), a graphics processing unit (GPU), an application specific integrated circuit, a programmable logic device, or the like.

The processor 104 is coupled to the memory 102 through a first communication path 106 and a second communication path 108. The processor 104 is configured to receive data from the memory through the first communication path 106. For example, the first communication path 106 may be a system memory interface with signal lines for data signals, strobe signals, clock signals, enable signals, or the like. That is, the communication path 106 may be part of a main memory channel that is the interface between the processor 104 and the memory 102 as the main system memory.

The processor 104 is also coupled to the memory 102 through a different communication path, the second communication path 108. The processor 104 is configured to receive the error information from the memory 102 through the second communication path 108. Thus, in an embodiment, the processor 104 is configured to receive error information and, in particular, corrected error information through a communication path other than the first communication path 106. The corrected error information is error information related to a corrected error. As described above, error information may include various types of information related to an error. Thus, the corrected error information may include similar types of information related to a corrected error.

Software 110 is illustrated as coupled to the processor 104; however, the software 110 represents various programs, drivers, modules, routines, or the like the may be executed on the processor 104. For example, the software 110 may include drivers, kernel modules, daemons, applications, or the like. In some embodiments, the software 110 may enable the processor 104 to be configured to perform particular functions described herein.

Although a single memory 102 has been used as an example, any number of memories 102 may be coupled to the processor 104 through two communication paths similar to the communication paths 106 and 108. In an embodiment, each memory 102 may be coupled to the processor 104 through a dedicated first communication path 106 separate from other memories 102 and a dedicated second communication path 108 also separate from other memories 102. In other embodiments, however, the first communication path 106 may be shared by more than one memory 102 and the second communication path 108 may be shared by more than one memory 102. Furthermore, although a single first communication path 106 has been described, multiple first communication paths 106 between one or more memories 102 may be present. Similarly, although a single second communication path 108 has been described, multiple second communication paths 108 between one or more memories 102 may be present.

In an embodiment, the communication of the error information may be communicated through an out-of-band communication path. The second communication path 108 may be such an out-of-band communication path. That is, the main communication between the processor 104 and the memory 102 may be through the first communication path 106, while the error information is communicated through the out-of-band second communication path 108.

Figure 2:
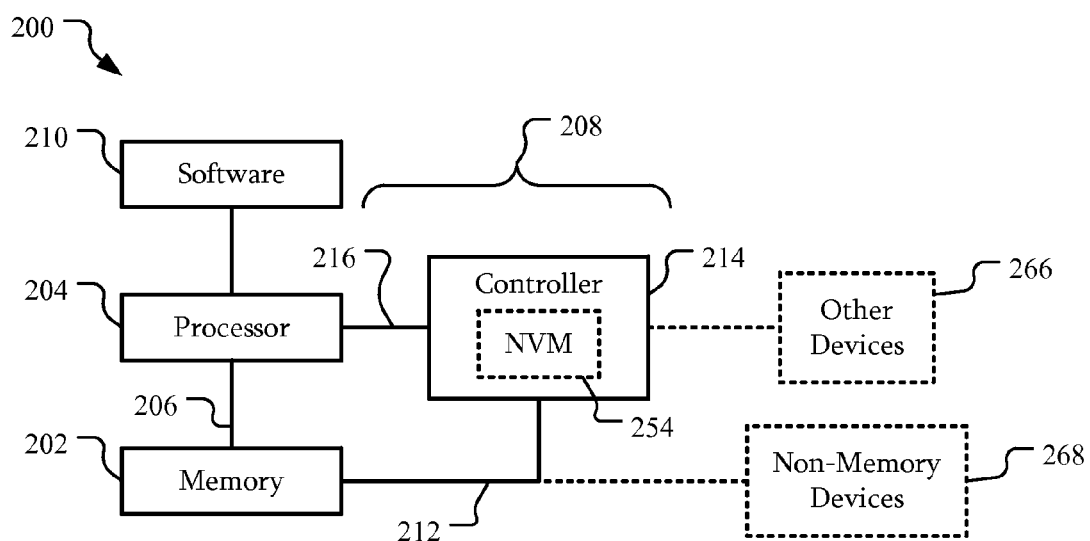
FIG. 2 is a schematic view of a system with a memory system architecture including a controller according to an embodiment.

FIG. 2 is a schematic view of a system with a memory system architecture including a controller according to an embodiment. In this embodiment, the system 200 includes a memory 202, a processor 204, communication paths 206 and 208, and software 210 similar to the memory 102, processor 104, communication paths 106 and 108, and software 110 of FIG. 1. The second communication path 208, however, includes a first bus 212 coupled between a controller 214 and a second bus 216 coupled between the controller 214 and the processor 204. In other words, the controller 214, coupled to both the processor 204 and the memory 202, is part of the second communication path 208.

The controller 214 may be any device configured to be operatively coupled to the memory 202 and the processor 204. For example, the controller 214 may include a general-purpose processor, a digital signal processor (DSP), an application specific integrated circuit, a programmable logic device, or the like.

The busses 212 and 216 may be any variety of communication links. For example, the buses 212 and 216 may be a system management bus (SMBus), an inter-integrated circuit ($I^2C$) bus, an intelligent platform management interface (IPMI) compliant bus, a Modbus bus, or the like. In a particular embodiment, at least one portion of the communication path 208 may be substantially slower than the communication path 206. For example, the communication path 206 between the memory 202 and processor 204 may be designed for higher data-rate transfers on the order of 10 GB/s; however, the communication path 208 may have a lower data transfer rate on the order of 10 Mbit/s, 100 kbit/s, or the like. Thus, in some embodiments, a ratio of the data transfer speed of the communication path 206 to the communication path 208 may be about 100, 1000, or more.

In an embodiment, the second communication path 208 may be a dedicated communication path. That is, the second communication path 208 may only be used for communication of information between the memory 202 and the processor 204. In other embodiments, however, the controller 214 may allow other devices to be accessible. For example, a non-memory device 268 may be coupled by the bus 212 to the controller 214. In another example, other devices 266 may be coupled to the controller 214. Accordingly, information other than information from the memory 202 may be transmitted over the bus 212 and/or the bus 216 to and from the processor 204 and/or memory 202. In particular, the error information from the memory 202 may be communicated to the processor 204 over a second communication path 208 that is used for other purposes, including non-memory purposes.

In an embodiment, the controller 214 may include non-volatile memory 254. The non-volatile memory 254 may be configured to store error information from the memory 202. Accordingly, error information may be maintained in the controller 214 when power is off. The processor 204 may be configured to request the error information from the controller 214. Accordingly, the controller 214 may be configured to respond to such a request by providing the error information stored in the non-volatile memory 254, accessing the memory 202 to retrieve the error information to respond to the processor 204, or the like.

In an embodiment, the controller 214 may be configured to poll the memory 202 for error information. In another embodiment, the memory 202 may be configured to push error information to the controller 214. Regardless, error information stored in the non-volatile memory 254 may be a substantially up-to-date copy.

Figure 3:
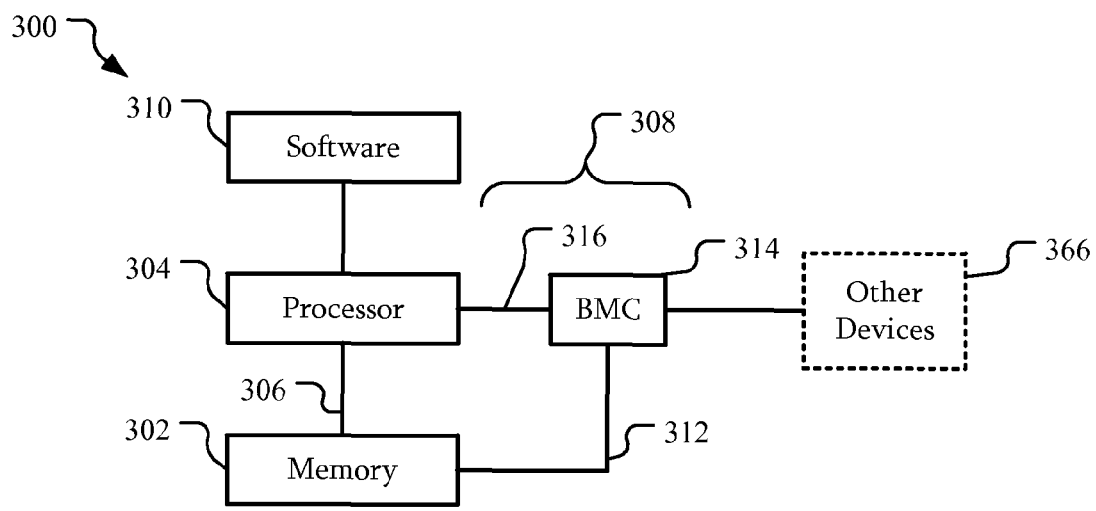
FIG. 3 is a schematic view of a system with a memory system architecture including a baseboard management controller according to an embodiment.

FIG. 3 is a schematic view of a system with a memory system architecture including a baseboard management controller (BMC) according to an embodiment. In this embodiment, the system 300 includes a memory 302, a processor 304, communication paths 306 and 308, and software 310 similar to the memory 202, processor 204, communication paths 206 and 208, and software 210 of FIG. 2. The controller 314 is, however, a baseboard management controller (BMC) 314.

The BMC 314 may be configured to manage the system 300. For example, the BMC 314 may be coupled to various sensors of the system 300, including sensors of the processor 304, memory 302, other devices 366, or the like. The BMC 314 may be configured to collect and report on various system parameters, such as temperature, cooling status, power status, or the like. The BMC 314 may be configured to manage the system and enable access to information according to a standard. The management information may be made available to the processor 304 and hence, available to the software 310. Alternatively, the BMC 314 may make the information available through another communication path, such as an out-of-band communication path. Here, an out-of-band communication path may include any communication path that does not include the processor 304.

Figure 4:
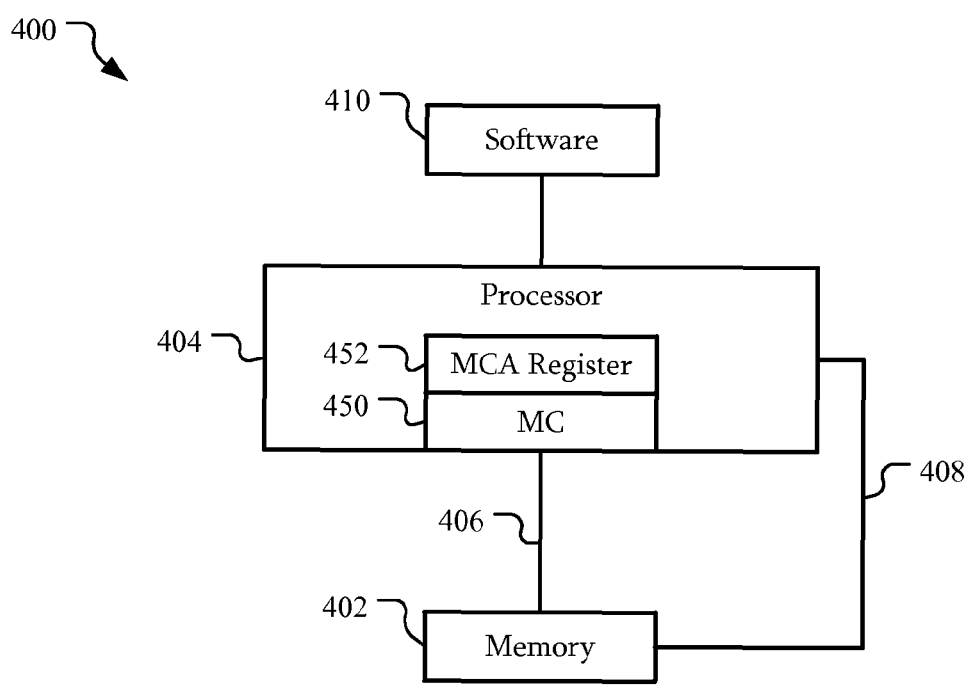
FIG. 4 is a schematic view of a system with a memory system architecture without processor-based error correction according to an embodiment.

FIG. 4 is a schematic view of a system with a memory system architecture without processor-based error correction according to an embodiment. In this embodiment, the system 400 includes a memory 402, a processor 404, communication paths 406 and 408, and software 410 similar to the memory 102, processor 104, communication paths 106 and 108, and software 110 of FIG. 1. In this embodiment, however, the processor 404 includes a memory controller (MC) 450 and a machine check architecture (MCA) register 452.

The memory controller 450 may be integrated with the processor 404. The memory controller 450 may be part of a main memory channel that is the main interface between the processor 404 and the memory 402. The memory controller 450 can be configured to control access to the data stored in the memory 402 through the communication path 406. In some embodiments, the memory controller 450 may be configured to correct errors, but would not have the opportunity to correct such errors as error correction may have been performed by the memory 402. In this embodiment, however, the memory controller 450 is not configured to correct errors in data read from the memory 402. The memory controller 450 may not be configured to report any error information based on data read from the memory 402.

The MCA register 452 is a register in which hardware errors may be reported. For example, cache errors, bus errors, data errors, or the like may be detected and reported in the MCA register 452. Because the memory controller 450 is not configured to correct errors in data read from the memory 402, however, any potential error information based on the data read from the memory 402 may not be reported in the MCA register 452. Regardless, as described above, the error information may be communicated to the processor 404 through the communication path 408. Thus, the error information may still be available to the software 410, albeit not through the memory controller 450 and MCA register 452.

In an embodiment, the availability of error information through the second communication path 408 may allow for a lower cost system 400. For example, a processor 404 with the memory controller 450 without any memory error correction may be used, yet error information may still be available. In particular, even if memory error correction is desired, a processor 404 without memory error correction may be used because the error information is available through the second communication path 408. Thus, the software 410, including any software that uses error information, may still operate as if the processor 404 was capable of memory error correction. A processor 404 without error correction may be a lower power, lower cost processor. Thus, an overall power usage and/or cost of the system 400 may be reduced.

Although the memory controller 450 has been illustrated as being integrated with the processor 404, the memory controller 450 may be separate from the processor 404. Regardless, the communication path 408 may bypass the memory controller 450 and other portions of the processor 404 that may otherwise have had error correction circuitry. The bypass of such components makes the communication of error information through the second communication path 408 substantially independent of the character of the memory controller 450, MCA register 452, or the like. That is, the error information may still be available even though similar information is not available through the memory controller 450 and/or the MCA register 452.

Figure 5:
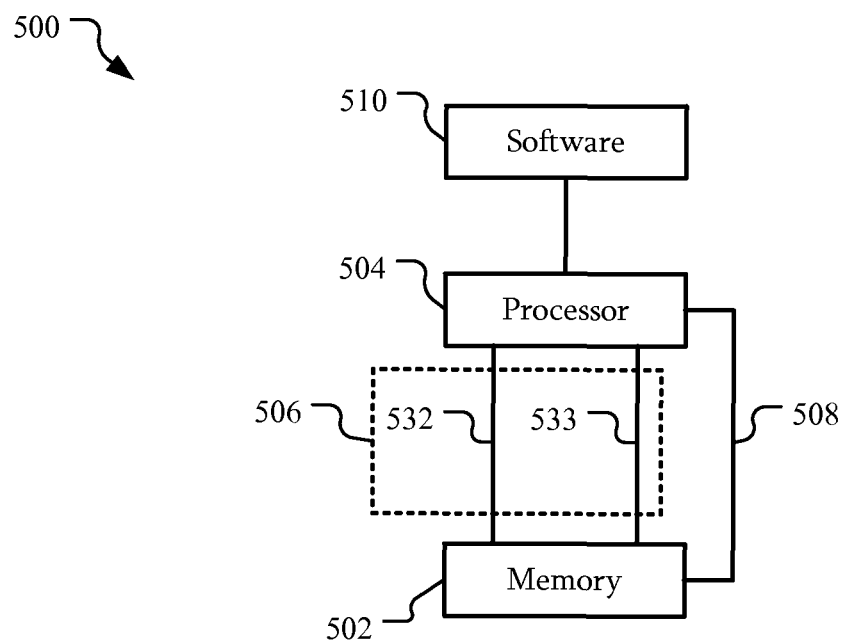
FIG. 5 is a schematic view of a system with a memory system architecture with a poisoned data strobe signal according to an embodiment.

FIG. 5 is a schematic view of a system with a memory system architecture with a poisoned data strobe signal according to an embodiment. In this embodiment, the system 500 includes a memory 502, a processor 504, communication paths 506 and 508, and software 510 similar to the memory 102, processor 104, communication paths 106 and 108, and software 110 of FIG. 1. In this embodiment, however, the communication path 506 includes data lines 532 and a data strobe line(s) 533. Other lines may be present as part of the communication path 506; however, for clarity, those lines are not illustrated.

In an embodiment, error information regarding uncorrectable errors and error information regarding correctable errors may be communicated by different paths. As described above, correctable error information may be communicated through the communication path 508. Uncorrectable error information may include a variety of different types of information based on an uncorrectable error. Uncorrectable error information may be communicated through the first communication path 506. For example, the memory 502 may be configured to communicate an uncorrectable error by a signal transmitted (or not transmitted) over the data strobe line(s) 533. That is, during a normal data transfer, a data strobe signal transmitted over the data strobe line(s) 533 may toggle as data is transferred; however, if the memory 502 has detected an uncorrectable error, the memory 502 may be configured to generate a data strobe signal for transmission over the data strobe line(s) 533 that is different from a data strobe signal during a normal data transfer. In a particular example, the memory 502 may be configured to not toggle the data strobe signal transmitted through the data strobe line(s) 533. When such a condition is detected, the processor 504 may be configured to generate a hardware exception, which may be handled by the software 510.

Although a particular example, of a signal and/or line within the communication path 506 has been used as an example of a technique to communicate an uncorrectable error, other signals and/or lines may be used to communicate an uncorrectable error to the processor 504. Regardless of how communicated, the processor 504 may be configured to respond to such a communication of an uncorrectable error, such as by halting the system 500 or taking another action.

Figure 6:
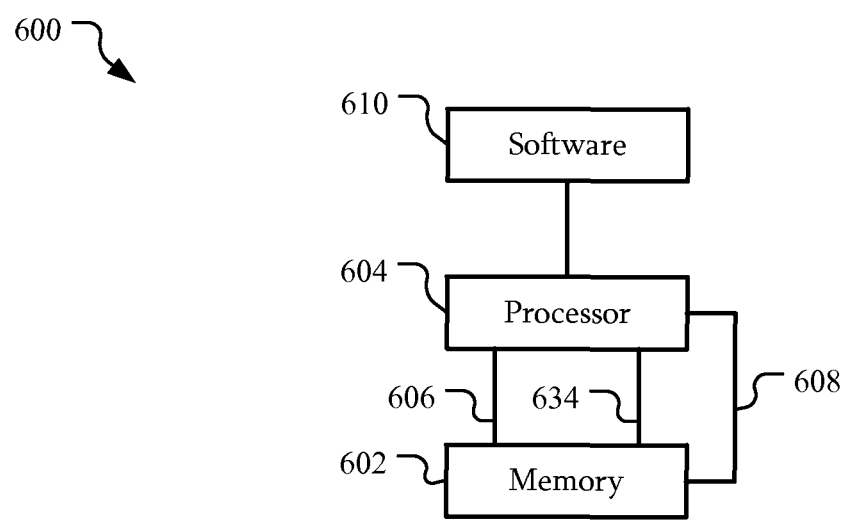
FIG. 6 is a schematic view of a system with a memory system architecture with a separate uncorrectable error signal according to an embodiment.

FIG. 6 is a schematic view of a system with a memory system architecture with a separate uncorrectable error signal according to an embodiment. In this embodiment, the system 600 includes a memory 602, a processor 604, communication paths 606 and 608, and software 610 similar to the memory 102, processor 104, communication paths 106 and 108, and software 110 of FIG. 1. In this embodiment, however, a separate communication path 634 is coupled between the memory 602 and the processor 604.

Similar to the system 500 of FIG. 5, an uncorrectable error may be communicated to the processor 604. In this embodiment, the memory 602 is configured to communicate uncorrectable error information over the third communication path 634. For example, the third communication path 634 may be a dedicated line separate from the first communication path 606. Thus, error information regarding uncorrectable errors may be received by the processor 604, but through a communication path other than the first and second communication paths 606 and 608.

Figure 7:
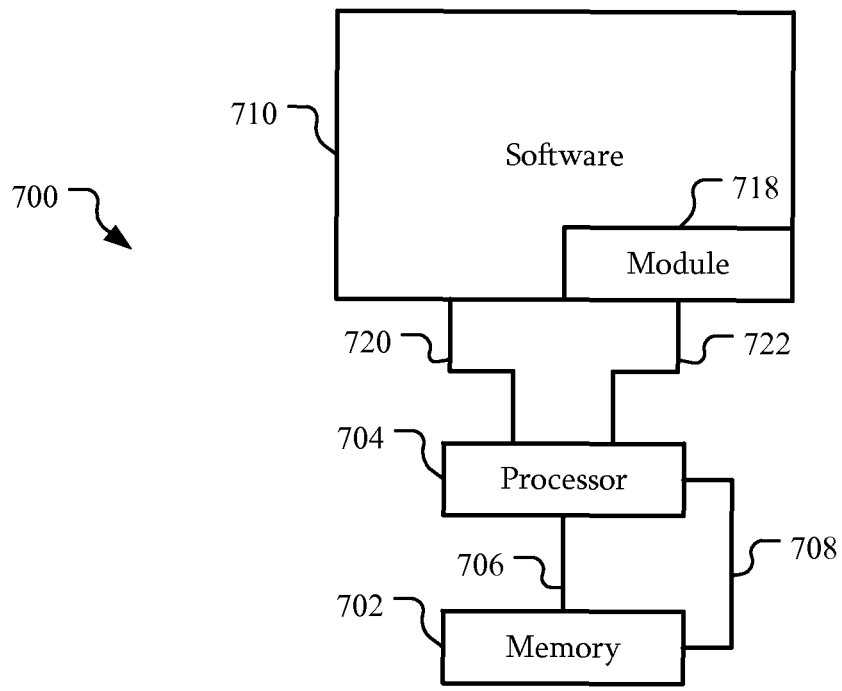
FIG. 7 is a schematic view of a system with a memory system architecture with a software module according to an embodiment.

FIG. 7 is a schematic view of a system with a memory system architecture with a software module according to an embodiment. In this embodiment, the system 700 includes a memory 702, a processor 704, communication paths 706 and 708, and software 710 similar to the memory 102, processor 104, communication paths 106 and 108, and software 110 of FIG. 1. In this embodiment, however, the software 710 includes a module 718.

The module 718 represents a part of the software 710 that is configured to access the error information 722 through the processor. For example, the module 718 may include a kernel module, a driver, an extension, or the like. The module 718 may include a driver for an interface associated with the communication path 708. In a particular example, the module 718 may include a driver associated with an IPMI bus, IPMI2 bus, or the like. Other information 720 may also be available to the software 710. The error information 722 is illustrated separately to indicate what portion of the software 710 is associated with the error information 722.

In an embodiment, the module 718 may cause the processor 704 to request error information from the memory 702. For example, the memory 702 may generate error information. At a later time the processor 704 may transmit a request for the error information through the communication path 708. The memory 702 may be configured to respond to the request with the error information through the communication path 708.

Figure 8:
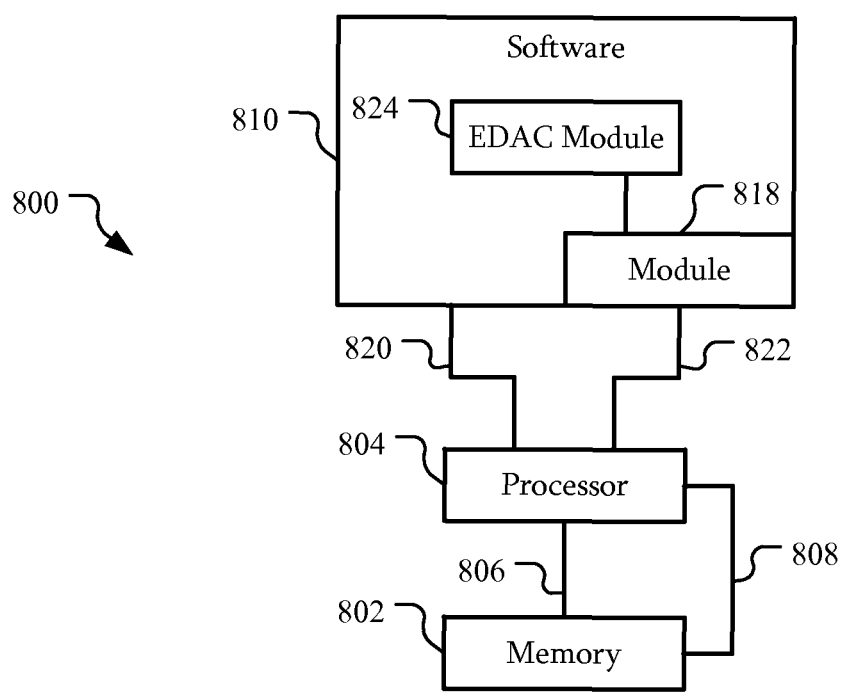
FIG. 8 is a schematic view of a system with a memory system architecture with an error detection and correction module according to an embodiment.

FIG. 8 is a schematic view of a system with a memory system architecture with an error detection and correction module according to an embodiment. In this embodiment, the system 800 includes a memory 802, a processor 804, communication paths 806 and 808, and software 810 with a module 818 responsive to information 820 and 822 similar to the memory 702, processor 704, communication paths 706 and 708, and software 710 with the module 718 responsive to information 720 and 722 of FIG. 7. In this embodiment, however, the software 810 also includes an error detection and correction (EDAC) module 824.

In an embodiment, the EDAC module may be configured to manage error information from memory, caches, input/output (I/O) devices, peripherals, busses, and/or other aspects of the system 800 and may be configured to expose such information to a higher functional layer, such as an application layer. In particular, the EDAC module 824 may be configured to receive the error information from the module 818. The EDAC module 824 may be configured to combine the error information with other information such that other modules, applications, or the like may have access to the error information.

Figure 9:
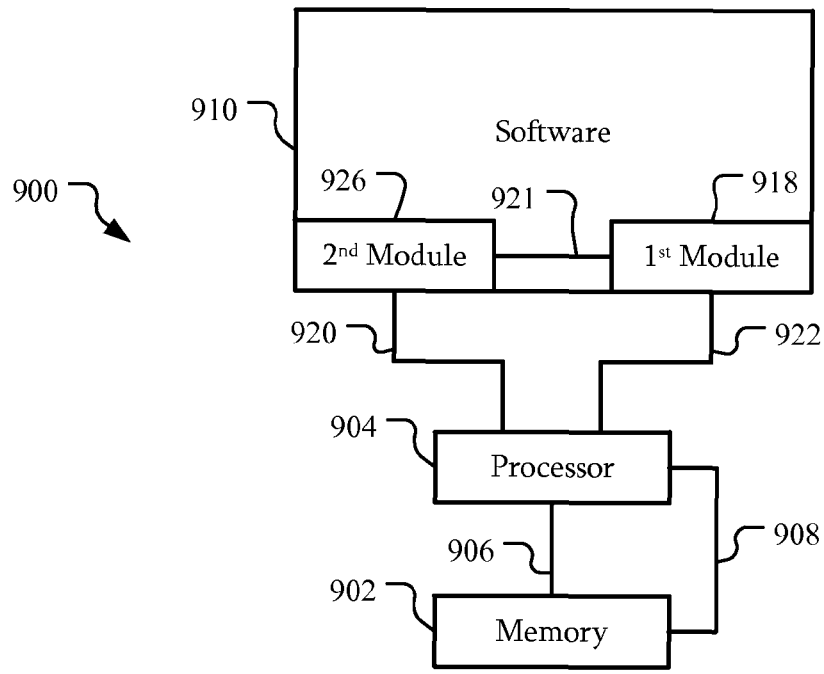
FIG. 9 is a schematic view of a system with a memory system architecture with an aggregating module according to an embodiment.

FIG. 9 is a schematic view of a system with a memory system architecture with an aggregating module according to an embodiment. In this embodiment, the system 900 includes a memory 902, a processor 904, communication paths 906 and 908, and software 910 with a first module 918 responsive to information 920 and 922 similar to the memory 702, processor 704, communication paths 706 and 708, and software 710 with the module 718 responsive to information 720 and 722 of FIG. 7. In this embodiment, however, the software 910 also includes a second module 926. The second module 926 is configured to receive information 920. In particular, this other information 920 may include information unrelated to an error on the memory 902. At least a part 921 of the other information 920 may be received by the first module 918. The first module 918 may be configured to combine the error information 922 with some or all of the other information 920 from the second module 926. The first module 918 may be configured to present the combined information with a single interface. For example, the first module 918 may be configured to present the combined information to an EDAC module, such as the EDAC module 824 of FIG. 8.

Figure 10:
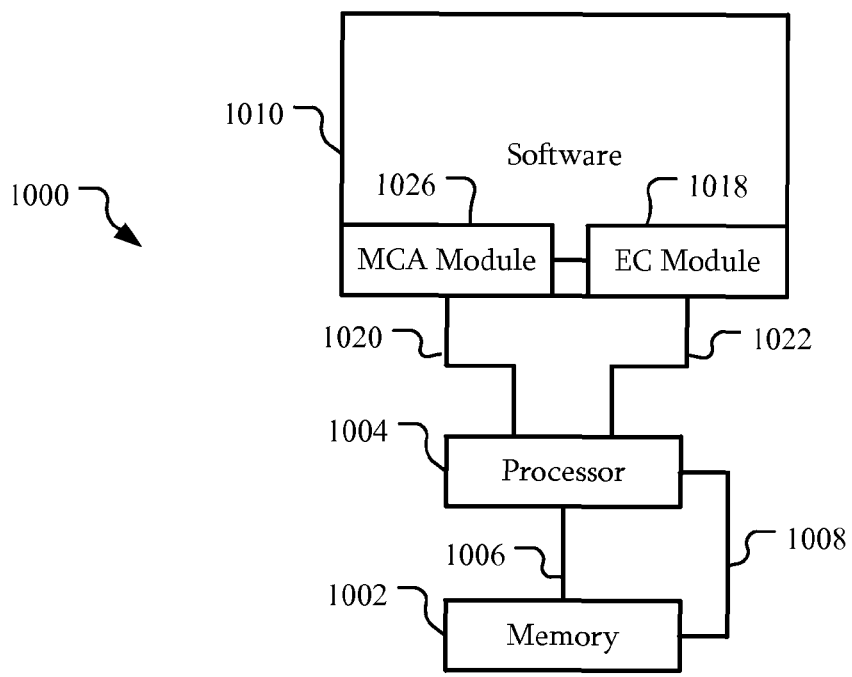
FIG. 10 is a schematic view of a system with a memory system architecture with an error correction module that aggregates information from a memory control architecture module according to an embodiment.

FIG. 10 is a schematic view of a system with a memory system architecture with an error correction module that aggregates information from a memory control architecture module according to an embodiment. In this embodiment, the system 1000 includes a memory 1002, a processor 1004, communication paths 1006 and 1008, and software 1010 with modules 1018 and 1026 responsive to information 1020 and 1022 similar to the memory 902, processor 904, communication paths 906 and 908, and software 910 with the modules 918 and 926 responsive to information 920 and 922 of FIG. 9. In this embodiment, however, the module 1018 is an error correction (EC) module 1018 and the second module 1026 is an MCA module 1026.

The MCA module 1026 is configured to control access to MCA registers, such as the MCA register 452 of FIG. 4. Information 1020 represents such information from the MCA registers. The EC module 1018 is configured to access the MCA module 1026 to retrieve such information 1020. The EC module 1018 may combine the information 1020 from the MCA module 1026 with the error information 1022 and present that combined information with a single interface.

In particular, the EC module may present an interface similar to or identical to that of an MCA module 1026 had the processor 1004 been able to correct errors. For example, if the processor 1004 was configured to correct errors in data read from the memory 1002 and such error information was available, that information may be available through the MCA module 1026. If, however, the processor 1004 is not configured to correct errors in data read from the memory 1002 or the processor 1004 is configured to correct errors, but never receives error information by a communication path monitored by the MCA module 1026 due to the errors being corrected in the memory 1002, the MCA module 1026 would not be able to present the error information. Regardless, the EC module 1018 may combine the MCA module 1026 information 1020 with error information 1022 obtained through communication path 1008 and present that combined information similar to or identical to information that the MCA module 1026 would have provided had the processor 1004 been configured to correct errors in data read from the memory 1002 or the error information was available to the MCA module 1026. Software may then use the same or similar interface regardless of whether a processor 1004 with error correction is present. In other words, a processor 1004 capable of error correction is not necessary for software relying upon error information to be fully operational. As a result, costs may be reduced by using a less expensive processor 1004 without error correction.

Figure 11:
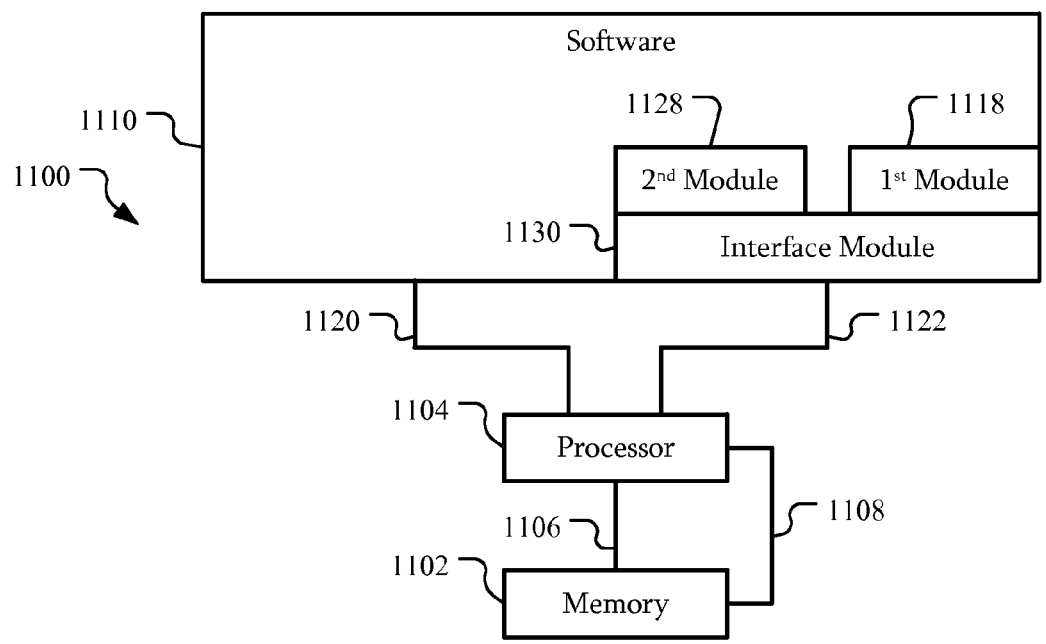
FIG. 11 is a schematic view of a system with a memory system architecture with multiple modules sharing an interface, according to an embodiment.

FIG. 11 is a schematic view of a system with a memory system architecture with multiple modules sharing an interface, according to an embodiment. In this embodiment, the system 1100 includes a memory 1102, a processor 1104, communication paths 1106 and 1108, and software 1110 responsive to information 1120 and 1122 similar to the memory 702, processor 704, communication paths 706 and 708, and software 710 responsive to information 720 and 722 of FIG. 7. In this embodiment, however, the software 1110 includes a first module 1118, a second module 1128 and an interface module 1130.

The first module 1118 is similar to the module 718 of FIG. 7. The first module 1118, however, is configured to receive error information from the memory 1102 through an interface module 1130. The interface module 1130 is a module configured to provide the interface to the communication path 1108. For example, the interface module 1130 may be a module configured to permit access over an IPMI bus.

Other modules, such as the second module 1128 may also be configured to communicate using the interface module 1130. For example, the second module 1128 may be configured to access another device attached to an IPMI bus, access another aspect of the memory 1102, such as thermal or power information, or the like. Both the error information and the other information may be part of the information 1122 transferred by the interface module 1130. In other words, the error information may be transferred using dedicated software along the entire path, but may also share modules, interfaces, busses, or the like with related or unrelated information and/or sources.

Figure 12:
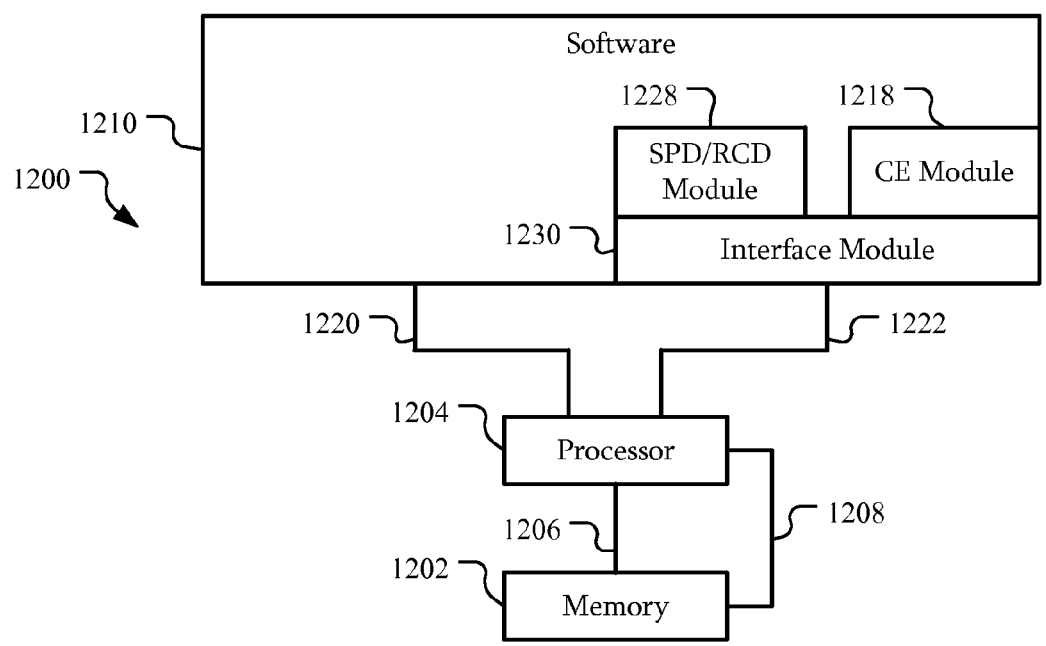
FIG. 12 is a schematic view of a system with a memory system architecture with a correctable error module and a serial presence detect/registering clock driver module sharing an interface according to an embodiment.

FIG. 12 is a schematic view of a system with a memory system architecture with a correctible error module and a serial presence detect/registering clock driver module sharing an interface according to an embodiment. In this embodiment, the system 1200 includes a memory 1202, a processor 1204, communication paths 1206 and 1208, and software 1210 with modules 1218, 1228, and 1230 responsive to information 1220 and 1222 similar to the memory 1102, processor 1104, communication paths 1106 and 1108, and software 1110 with modules 1118, 1128, and 1130 responsive to information 1120 and 1122 of FIG. 11. In this embodiment, however, the first module 1218 is a corrected error (CE) module 1218 and the second module 1228 is a serial presence detect (SPD)/registering clock driver (RCD) module 1228.

In particular, the SPD/RCD module 1228 is configured to access information related to a serial presence detect system and/or a registering clock driver system. The SPD/RCD module 1228 may be configured to access one or both of such systems. The information is accessed through the second communication path 1208. Thus, in an embodiment, the error information from the memory 1202 may be accessed through the same communication path 1208 as SPD/RCD related information.

Figure 13:
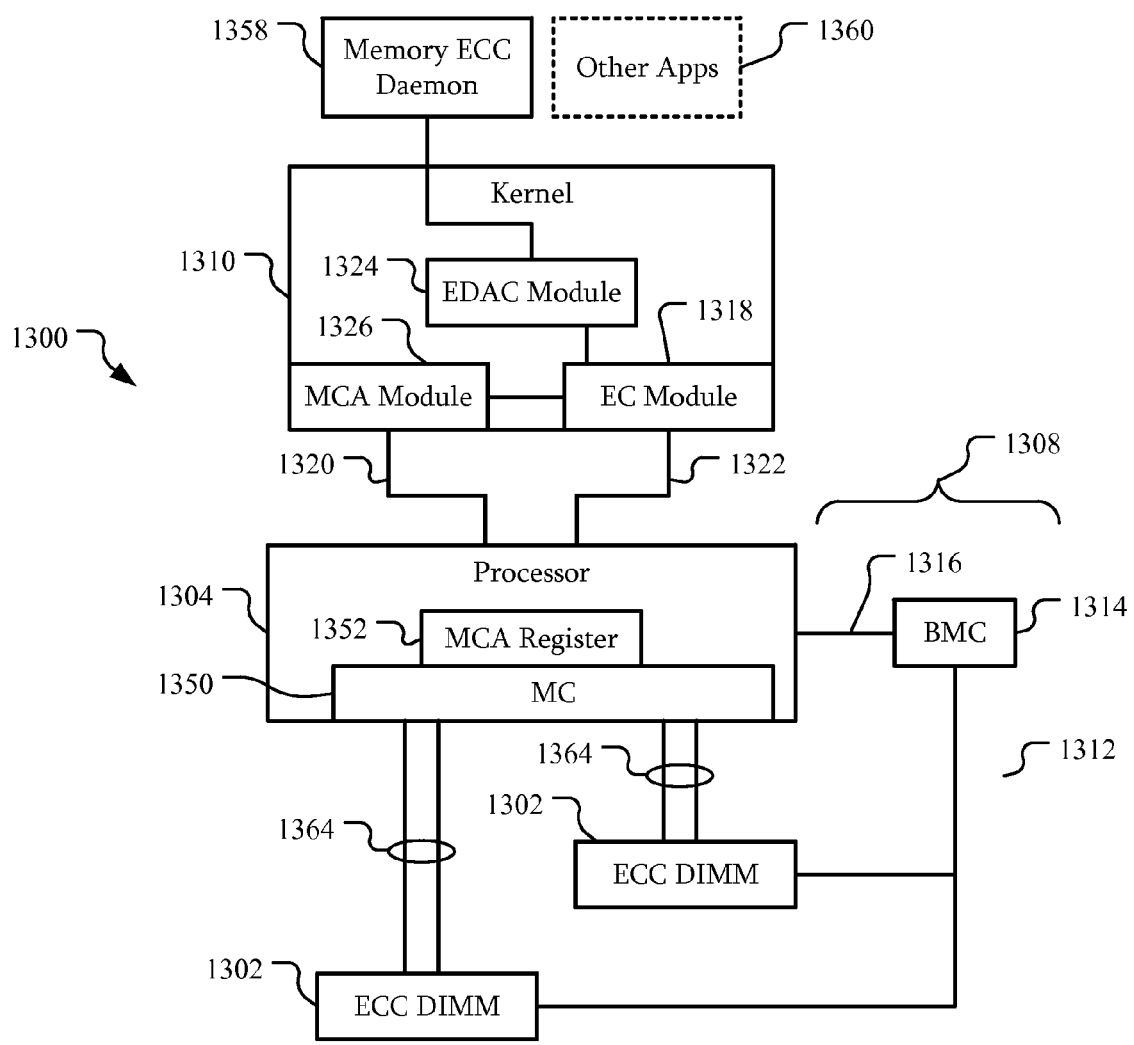
FIG. 13 is a schematic view of a system with a memory system architecture with in-DRAM error correction according to an embodiment.

FIG. 13 is a schematic view of a system with a memory system architecture with in-DRAM error correction according to an embodiment. In this embodiment, the system 1300 includes memories 1302, a processor 1304, kernel 1310 with an EC module 1318 and an MCA module 1326 responsive to information 1320 and 1322 similar to the memory 1002, processor 1004, and software 1010 with the EC module 1018 and MCA module 1026 responsive to information 1020 and 1022 of FIG. 10. In this embodiment, however, each of the memories 1302 is error correction code (ECC) dual in-line memory module (DIMM). Each ECC DIMM 1302 is configured to store data and correct at least an error in the stored data. In this embodiment, the ECC DIMMs 1302 are each coupled to a memory controller (MC) 1350 of the processor 1304 through corresponding communication paths 1364. The communication paths 1364 include at least lines for data signals and data strobe signals or the like similar to the communication path 506 of FIG. 5. The ECC DIMMs 1302 are each coupled to the processor 1304 through a communication path 1308 including a bus 1312, a BMC 1314, and a bus 1316 similar to the bus 312, BMC 314, and bus 316 of FIG. 3.

In an embodiment, the ECC DIMMs 1302 may be configured to correct one or more errors in data read from the ECC DIMMs 1302. The error correction techniques may include a single error correction-double error detection (SEC-DEC) technique, a single-chip chipkill technique, a double-chip chipkill technique, or the like. Any error correction technique may be used.

In this embodiment, the memory controller (MC) 1350 is not configured to perform error correction or alternatively, is not configured to receive error information from the ECC DIMMs 1302. As the data passed from the ECC DIMMs 1302 is already corrected, the MC 1350 may not even receive any information representing a correctible error. The error information and, in particular, corrected error information, however, may be transmitted to the processor 1304 through the communication path 1308, i.e., through the busses 1312 and 1316, and the BMC 1314.

In an embodiment, the processor 1304 may be an existing processor that is otherwise not capable of performing error correction, but has an interface capable of connecting to the bus 1316. Once, however, the processor 1304 is configured by the kernel 1310 and, in particular, the EC module 1318, the overall system 1300 may be configured to perform error correction similar to a system having a processor capable of error correction.

In an embodiment, the EC module 1318 may create a virtual memory controller with ECC interface. For example, as described above, the EC module 1318 may be configured to receive information from the MCA module 1326. That information may be the information that an actual memory controller with ECC interface may provide without some or all error information. The EC module 1318 may supplement the information from the MCA module 1326 with the error information to create a complete set of information expected from a memory controller with ECC interface. As a result, the EDAC module 1324, a memory ECC daemon 1358, other applications 1360, or the like may be used without change from those used with processors with error correction. For example, the EDAC module 1324 may be configured to poll the EC module 1318 for memory ECC information. In return, the EC module 1318 may return the error information received through the second communication path 1308. The memory ECC daemon 1358, in communication with the EDAC module 1324, may poll the EDAC module 1324 for error information. The memory ECC daemon 1358 may then take actions according to the error information at an application level. Such actions may include page retirement, other actions to manage errors to keep the system 1300 running, maintain a level of reliability, recommend decommissioning, or the like.

As described above, an uncorrectable error may be detected. The uncorrectable error information may be communicated through the MC 1350, MCA register 1352, and MCA module 1326 to the EC module 1318. For example, an uncorrectable error may be communicated by a non-maskable interrupt, exception, or the like through the MCA module 1326. In a particular example, the memory controller 1350 may generate a hardware exception in response to an uncorrectable error, regardless of how communicated to the memory controller 1350. The MCA module 1326 may intercept that exception and pass it to the EC module 1318. The EC module 1318 may then communicate the exception to the EDAC module 1324. In addition to or instead of communicating uncorrectable error information as described above, uncorrectable error information may be communicated through the communication path 1308.

In an embodiment, the ECC DIMMs 1302 may be configured to provide corrected data to the processor 1304. The data, however, may become corrupted between the ECC DIMMs 1302 and the MC 1350. Accordingly, some form of error correction may be performed between the ECC DIMMs 1302 and the processor 1304 or MC 1350. For example, the data transmitted from the ECC DIMMs 1302 may be encoded with error correction codes intended to detect errors that occur over the communication link 1364. With such error correction, substantially the entire path from storage element in the ECC DIMMs 1302 to the processor may be protected with error correction.

Figure 14A:
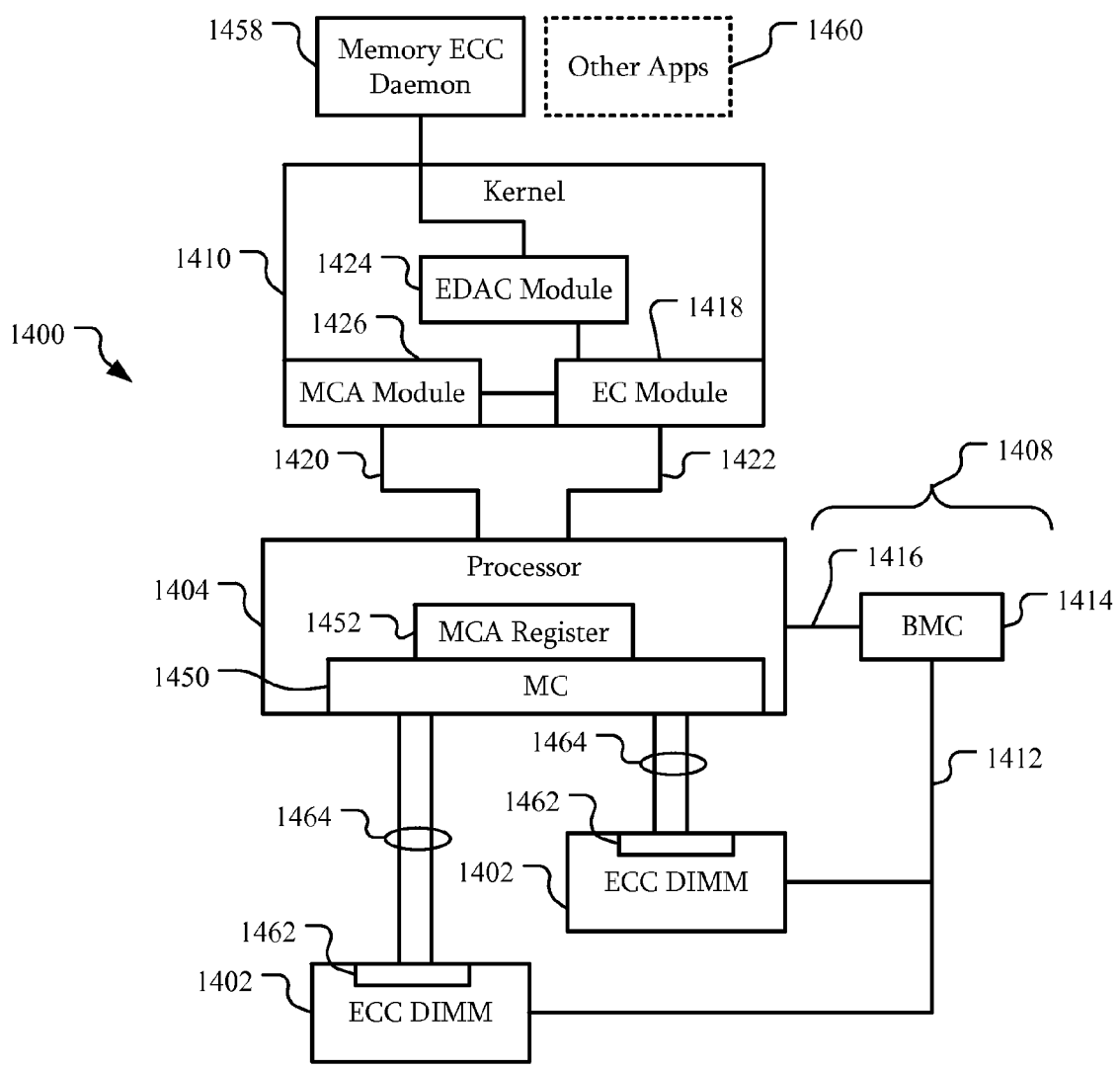
FIGS. 14A-D are schematic views of systems with a memory system architecture with in-module error correction according to some embodiments.

FIGS. 14A-D are schematic views of systems with a memory system architecture with in-module error correction according to some embodiments. Referring to FIG. 14A, the system 1400 includes components similar to those of FIG. 13; however, in this embodiment, the ECC DIMMs 1402 include a buffer 1462. The buffer 1462 is configured to correct errors in data read from the corresponding ECC DIMM 1402. In particular, uncorrected data may be read from internal memory devices, such as DRAM devices (not illustrated) of the ECC DIMM 1402. The buffer 1462 may be configured to correct the uncorrected data and generate corrected error information similar to other memories described herein. That error information may be communicated through the communication path 1408, and may be used as described above. That is, the error information may be used as described above regardless of how the error information is generated.

Figure 14B:
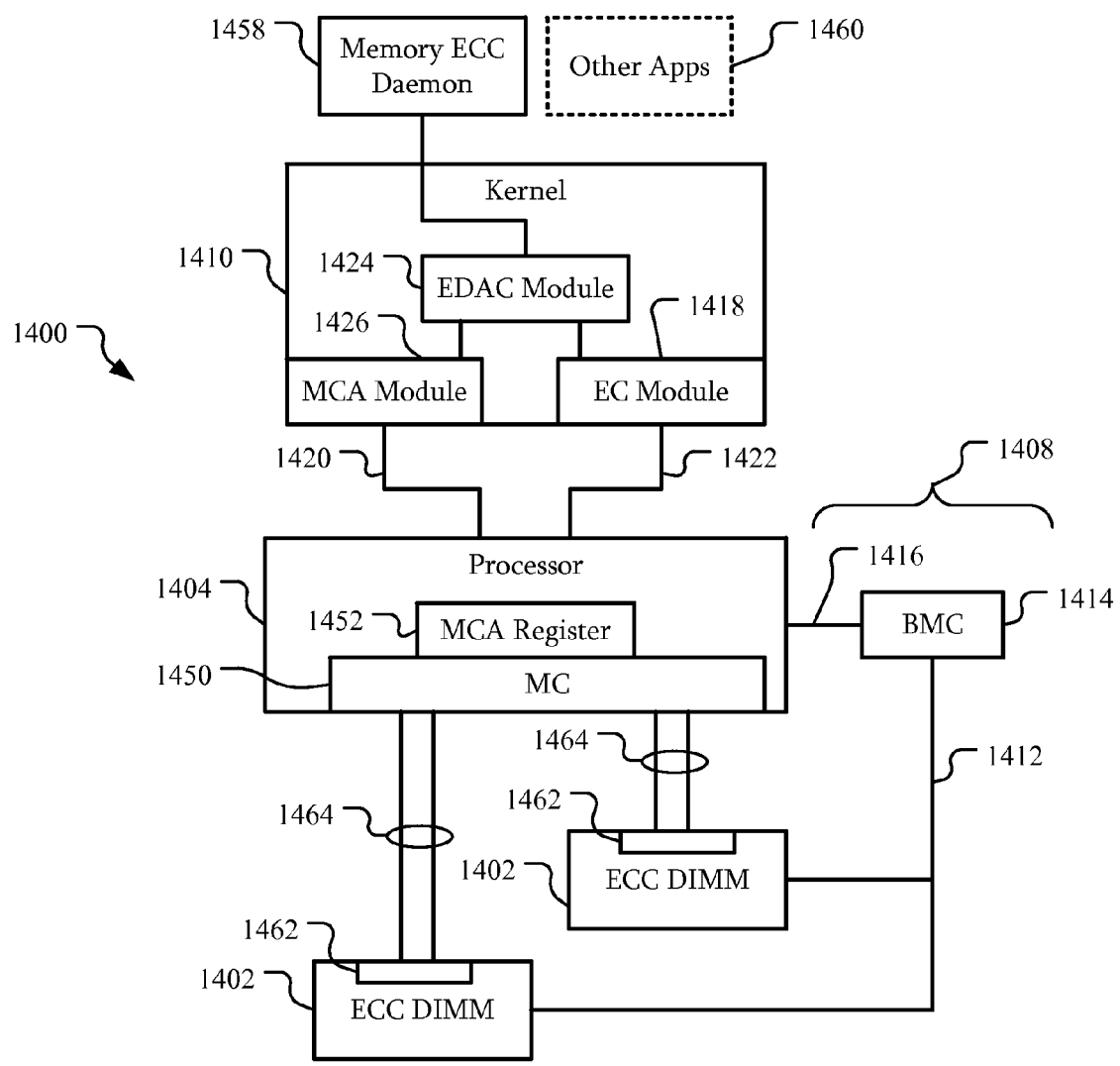

Referring to FIG. 14B, the components of the system 1400 may be similar to those of FIG. 14A. In this embodiment, however, the EDAC module 1424 is configured to communicate with the MCA module 1426. For example, the EDAC module 1424 may be configured to poll the MCA module 1426 for hardware related information, uncorrectable error information, or other information available through the MCA module 1426 as described above. The EDAC module 1424 may be configured to combine the information from the MCA module 1426 with information from the EC module 1418.

Figure 14C:
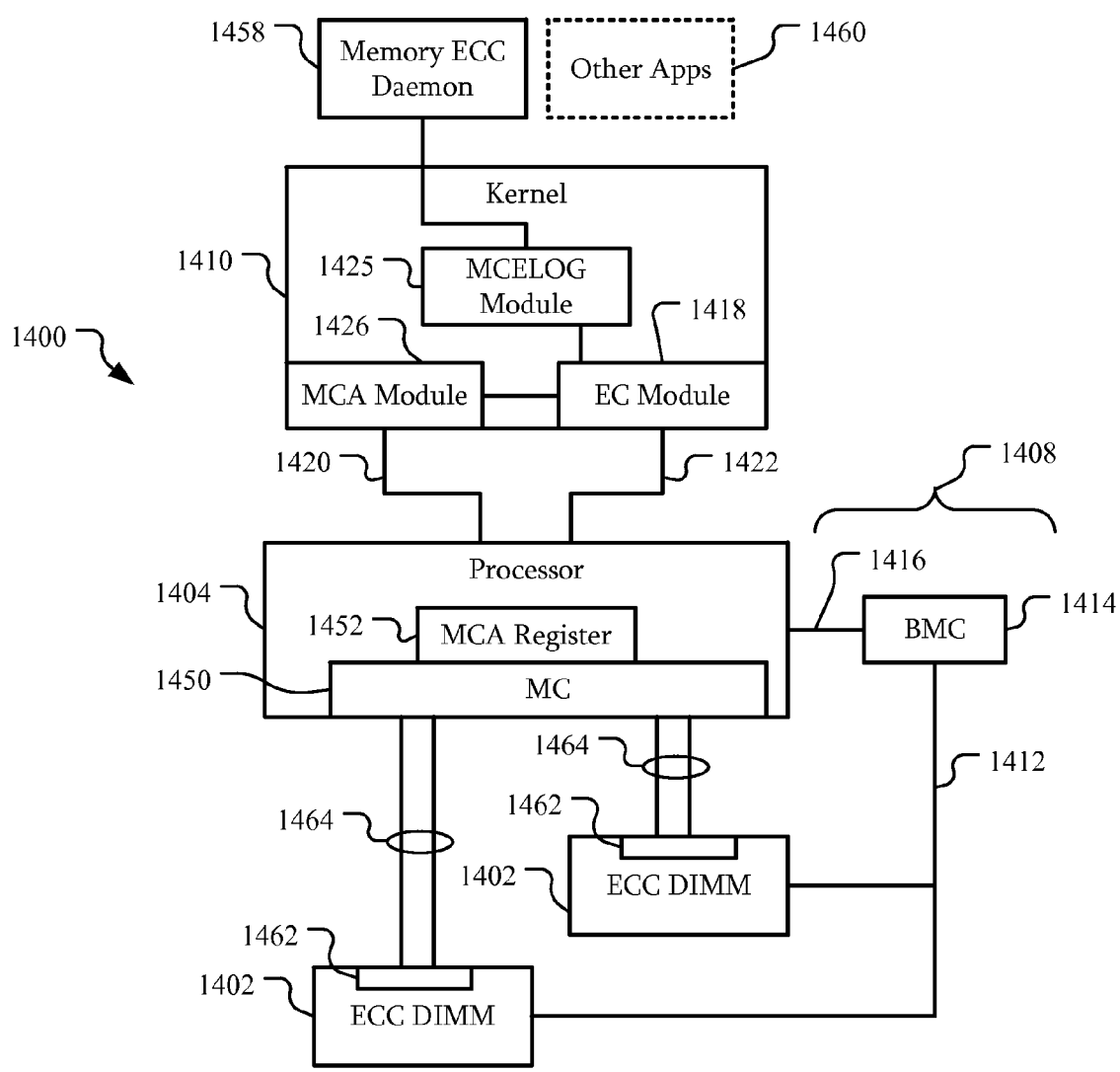

Referring to FIG. 14C, the components of the system 1400 may be similar to those similar to those of FIG. 14A. In this embodiment, however, an MCELOG module 1425 is configured to receive information from the CE module 1418. The MCELOG module 1425 may be configured to record machine check events (MCEs) related to various system errors, such as memory errors, data transfer errors, or other errors. The MCELOG module 1425 may be configured to raise an interrupt to the Memory ECC Daemon 1458 and pass error information to the Memory ECC Daemon 1458.

Figure 14D:
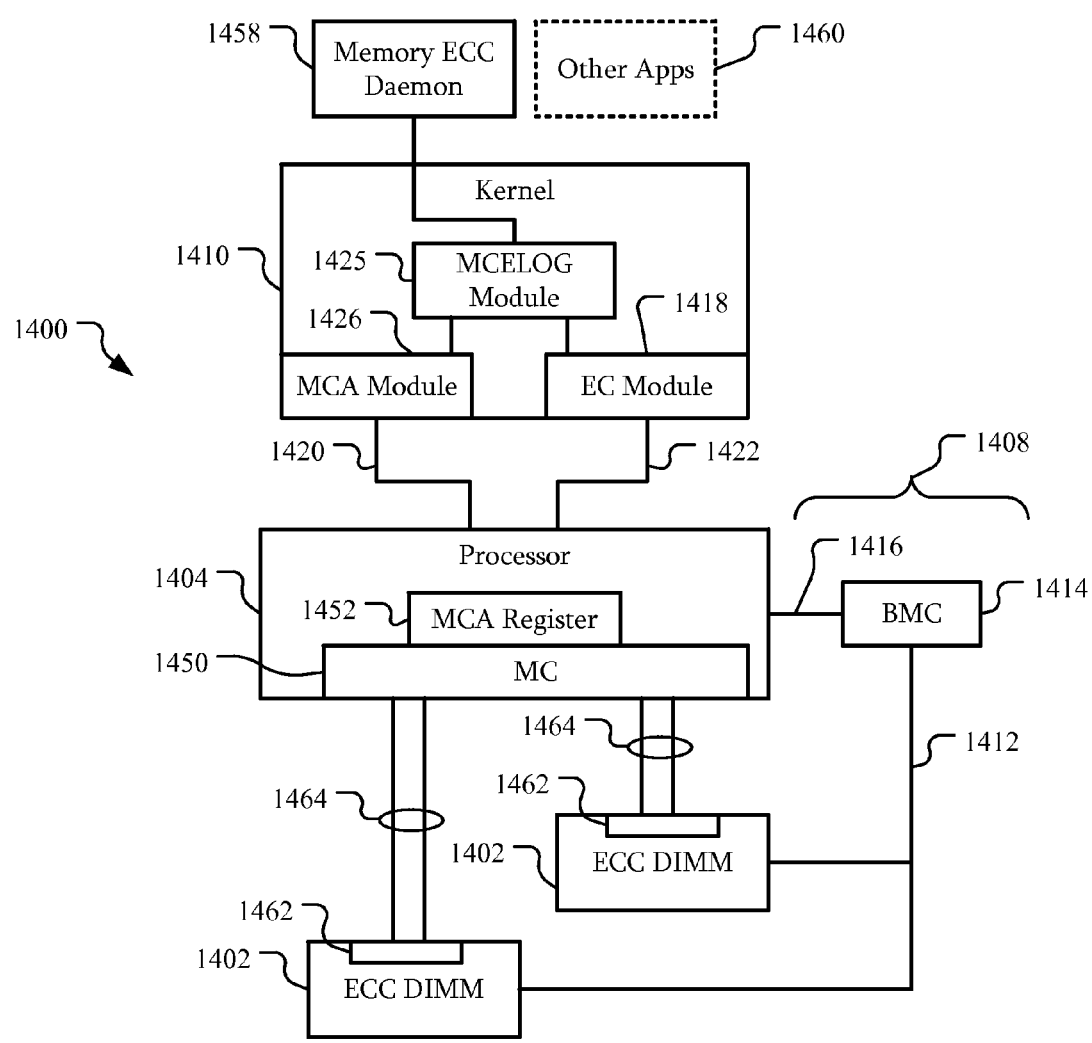

Referring to FIG. 14D, the components of the system 1400 may be similar to those of FIG. 14C. However, in this embodiment, similar to the difference between FIGS. 14A and 14B, the MCELOG module 1425 may be configured to receive information from the MCA module 1426 similar to the EDAC module 1424 of FIG. 14B.

Although different modules have been described with respect to ECC DIMMs 1402 with buffers 1462 in FIGS. 14A-D, in other embodiments, the various configurations may be applied to the system 1300 of FIG. 13 with ECC DIMMs 1302.

Figure 15:
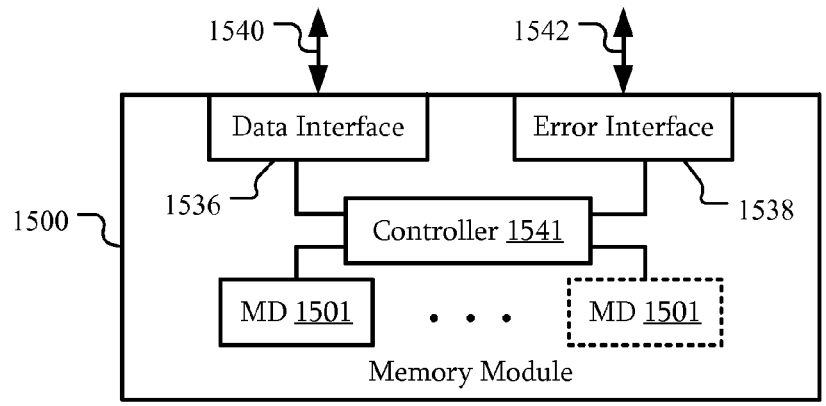
FIG. 15 is a schematic view of a memory module according to an embodiment.

FIG. 15 is a schematic view of a memory module according to an embodiment. The memory module 1500 includes one or more memory devices 1501, a data interface 1536, an error interface 1538, and a controller 1541. The data interface 1536 is configured to transmit and receive data 1540 from data stored in the memory devices 1501. The memory module 1500 is configured to generate error information for data read from the one or more memory devices 1501. The error interface 1538 is configured to transmit error information generated in response to correcting an error in data read from the one or more memory devices 1501.

The data interface 1536 is the interface through which data stored in the memory devices 1501 is transmitted and the interface through which data 1540 to be stored in the memory devices 1501 is received. For example, the data interface 1536 may include buffers, drive circuits, terminations, or other circuits for lines, such as data lines, strobe lines, address lines, enable lines, clock lines, or the like.

The error interface 1538 may be an interface configured to communicate over a particular bus, such as SMBus, IPMI, or other buses as described herein. In an embodiment, the error interface 1538 may be an existing interface through which the memory module 1500 communicates other information in addition to the error information. Thus, the information 1542 would include not only the error information, but also the other information.

The controller 1541 may be any device configured to be operatively coupled to the memory devices 1501. For example, the controller 214 may include a general-purpose processor, a digital signal processor (DSP), an application specific integrated circuit, a programmable logic device, or the like. As will be described in further detail below, the controller 1541 may include a buffer, such as an RCD, or the like.

The controller 1541 is coupled to the memory devices 1501, the data interface 1536, and the error interface 1538. The controller 1541 is configured to obtain the error information. In an embodiment, the controller 1541 may obtain the error information from the memory devices 1501; however, in other embodiments, the controller 1541 may be configured to correct errors in data from the memory devices 1501 and generate the error information.

In an embodiment the controller 1541 may be configured to communicate an uncorrectable error through the data interface 1536. For example, as described above, a data strobe signal may be used to indicate an uncorrectable error. The controller 1541 may be configured to modify the data strobe signal transmitted through the data interface 1536 in response to detecting an uncorrectable error.

Figure 16:
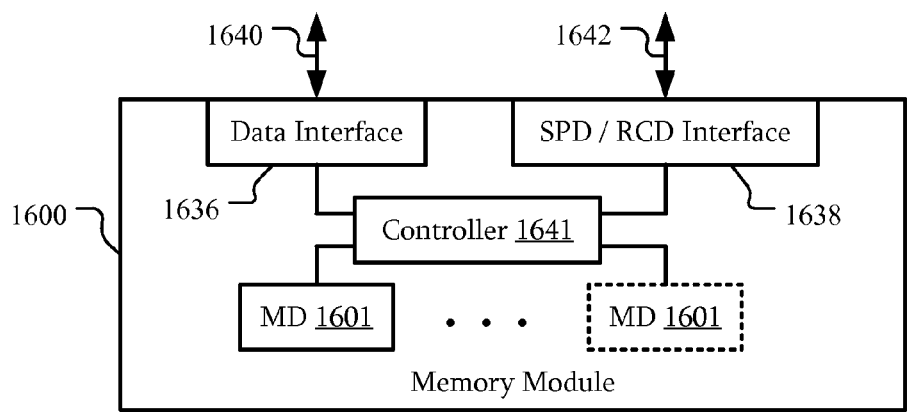
FIG. 16 is a schematic view of a memory module with an SPD or RCD interface according to an embodiment.

FIG. 16 is a schematic view of a memory module with an SPD or RCD interface according to an embodiment. In this embodiment, the memory module 1600 includes one or more memory devices 1601, a data interface 1636, an error interface 1638, and a controller 1641 similar to the one or more memory devices 1501, data interface 1536, error interface 1538, and controller 1541 of FIG. 15. The error interface 1538 of FIG. 15, however, is an SPD/RCD interface 1638 here.

The SPD/RCD interface 1638 may be used to provide access to an SPD system or an RCD system (not illustrated). In a particular embodiment, the error information may be available through a particular register or memory location within such an SPD or RCD system. Thus, the error information may be obtained through the same interface the SPD or RCD information may be obtained.

As the error information is available through an existing hardware interface, additional hardware may not be needed. For example, a command received through the SPD/RCD interface 1638 intended to access error information may be different from other commands by an address, register address, or other field unused by SPD/RCD systems. In an embodiment, a new register for SPD/RCD systems may be defined that exposes the error information. In another embodiment, an existing register may be reused to communicate the error information.

Figure 17:
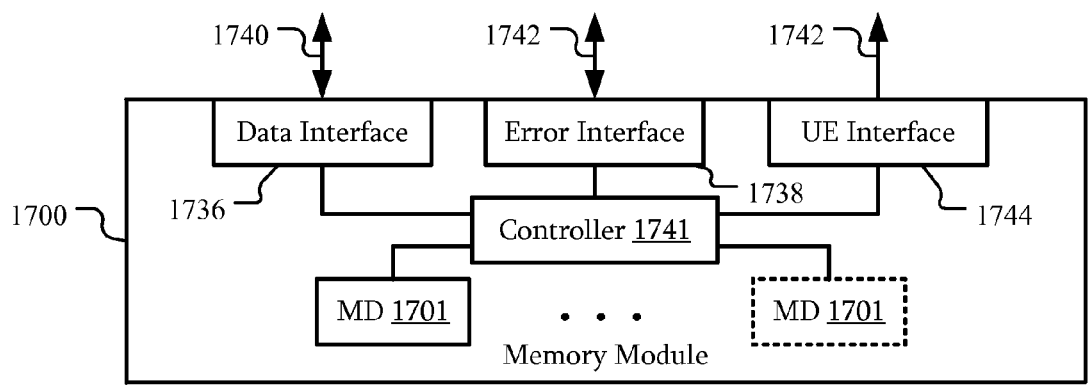
FIG. 17 is a schematic view of a memory module with a separate uncorrectable error interface according to an embodiment.

FIG. 17 is a schematic view of a memory module with a separate uncorrectable error interface according to an embodiment. In this embodiment, the memory module 1700 includes one or more memory devices 1701, a data interface 1736, an error interface 1738, and a controller 1741 similar to the one or more memory devices 1501, the data interface 1536, the error interface 1538, and the controller 1541 of FIG. 15. The memory module 1700, however, also includes an uncorrectable error (UE) interface 1744.

The UE interface 1744 is a separate interface through which the memory module 1700 is configured to communicate uncorrectable errors. For example, the UE interface 1744 may be a dedicated line, a dedicated bus, or the like.

Figure 18:
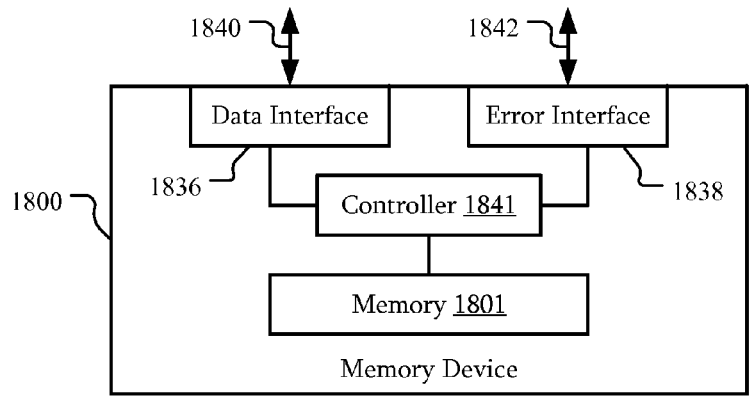
FIG. 18 is a schematic view of a memory device according to an embodiment.

FIG. 18 is a schematic view of a memory device according to an embodiment. In this embodiment, the memory device 1800 includes a data interface 1836 and an error interface 1838. The data interface 1836 and the error interface 1838 may be similar to the data interface 1536 and the error interface 1538 of FIG. 15, or the like as described above; however, in this embodiment, the data interface 1836 and the error interface 1838 are interfaces to the memory device 1800 rather than a memory module, such as a memory module 1500 of FIG. 15.

The memory device 1800 includes a controller 1841. The controller 1814 may be any device configured to be operatively coupled to the memory 1801 and the interfaces 1836 and 1838. For example, the controller 1841 may include a general-purpose processor, a digital signal processor (DSP), an application specific integrated circuit, a programmable logic device, or the like. The memory 1801 is configured to store data. For example, the memory 1801 may be a memory cell array; however, in other embodiments, the data may be stored in other configurations. The memory 1801 may include electrical, magnetic, chemical, optical, or other types of storage elements.

The controller 1841 is configured to transmit data stored in the memory 1801 through the data interface 1836. The controller may also be configured to receive data to be stored in the memory 1801 through the data interface 1836. Such transfers are represented by data 1840.

The controller 1841 is configured to transmit error information generated in response to correcting an error in data read from memory 1801 through the error interface 1838. The error information may be similar to any of the types of error information described above. The controller 1841 may also be configured to receive commands, instructions, or other information through the error interface 1838. Such transfers of error information, commands, instructions, or other information is represented by information 1842. In this embodiment, both the data 1840 and information 1842 are illustrated as passing through the controller 1841. In other embodiments, however, components of the memory device 1800 may be controlled by the controller 1841 such that data 1840 and information 1842 does not pass through the controller 1841. For example, in some embodiments, the data and/or error information may be provided to the data interface 1836 and error interface 1838 under control of the controller 1841, but bypassing the controller 1841.

Figure 19:
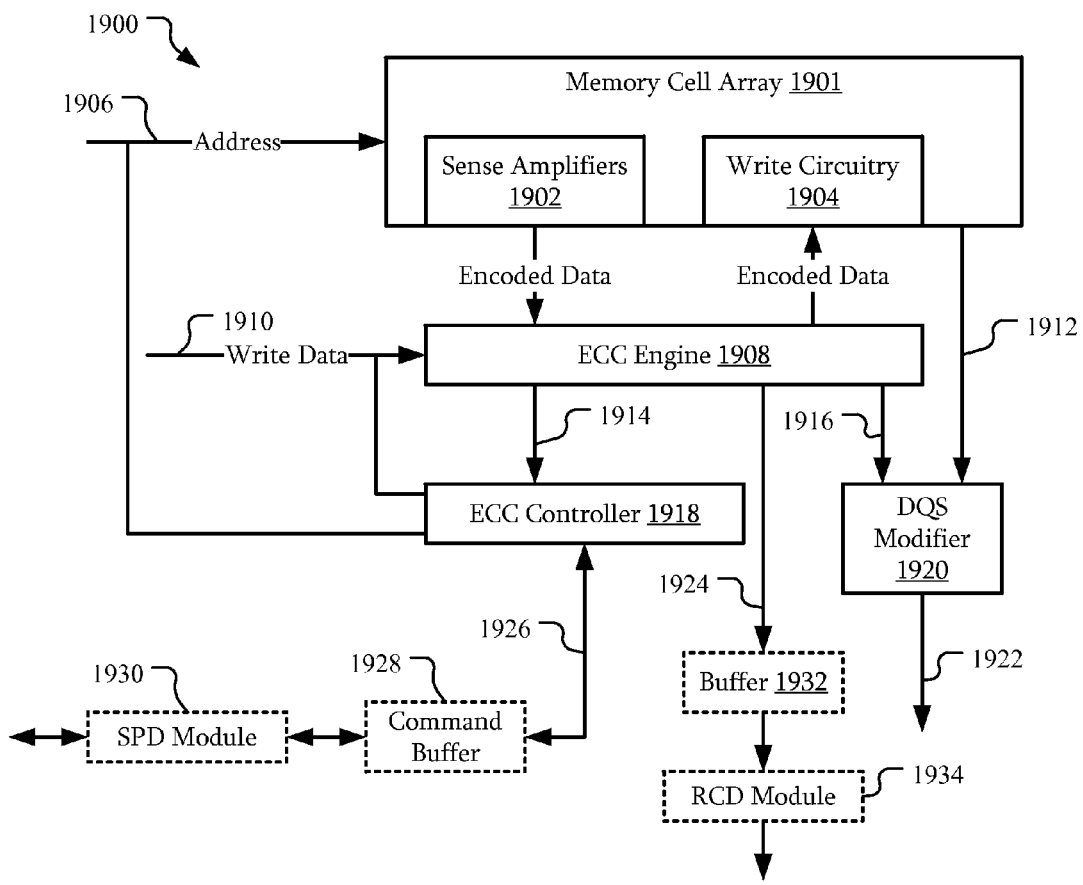
FIG. 19 is a schematic view of a memory device according to another embodiment.

FIG. 19 is a schematic view of a memory device according to another embodiment. In this embodiment, the memory device 1900 includes a memory cell array 1901. The memory cell array 1901 may include memory cells in which data is stored. In particular, the memory cell array 1901 may be configured to store encoded data. Sense amplifiers 1902 and write circuitry 1904 are examples of circuitry in the memory device 1900 that allows data to be written to and read from the memory cell array 1901 to an address or addresses specified by the address 1906. In other embodiments, however, other read and write circuitry may be associated with the memory cell array 1901. Furthermore, although the sense amplifiers 1902 and write circuitry 1904 are illustrated as part of the memory cell array 1901, such circuitry may be separate from the memory cell array 1901. In addition, although a single memory cell array 1901 is illustrated, multiple memory cell arrays 1901 may be present.

The memory cell array 1901 is coupled to an error correcting code (ECC) engine 1908. The ECC engine 1908 is configured to correct at least one error in data read from the memory by encoding data written to the memory cell array 1901 and decoding data read from the memory cell array 1901. In particular, the ECC engine 1908 may be configured to receive write data 1910. The ECC engine 1908 may be configured to encode the write data 1910 such that the encoded data may be written to the memory cell array 1901 by the write circuitry 1904 to a location specified by the address 1906. Similarly, the ECC engine 1908 may be configured to receive encoded data read from the memory cell array 1901 and decode that data into decoded output data 1924. Such encoding and decoding may be performed according to any number of ECC algorithms as described herein. As an example, Single Error Correct-Double Error Detect (SEC-DED) may be used as the ECC algorithm; however others may be used.

Although signals such as an address 1906 and write data 1910 are illustrated as signals used in writing data to the memory cell array 1901, the memory device 1900 may be configured to receive and process other signals involved in writing data to the memory cell array 1901; however, such components are omitted for clarity. Furthermore, other components that may modify an address 1906, redirect an access, or the like may be present, but are also not illustrated for clarity.

In a particular example, during a write operation, the ECC Engine 1908 is configured to receive the bits the memory device 1900 should store as the write data 1910. The ECC Engine 1908 is configured to calculate the ECC bit value(s) for the write data 1910 and pass these ECC bit(s), along with the original data values as the encoded data, to the memory cell array 1901 using the write circuitry 1904. The memory cell array 1901 is then configured to store the encoded data.

During a read operation, the ECC Engine 1908 is configured to receive encoded data from the memory cell array 1901. That is, the sense amplifiers 1902 and other circuitry are used to read the previously stored ECC bit(s) and original data values as the encoded data. The ECC engine 1908 may then decode the encoded data, generate output data 1924, and generate any error information.

The output data 1924 may then be output from the memory device 1900. In some embodiments, other components may be disposed between the ECC engine 1908 and the output of the memory device 1900. In an embodiment, a buffer 1932 may be configured to buffer the output data 1924. In another embodiment, an RCD module 1934 may be configured to receive, buffer, and output the output data 1924. Here, examples of such optional components are illustrated with dashed lines.

The ECC engine 1908 is also configured to generate error flags. For example, the ECC engine 1908 may be configured to generate a correctable error (CE) flag. The CE flag may be set when the ECC engine 1908 successfully corrects an n-bit error, in which n is less than or equal to a number of bit-errors that the ECC engine 1908 is configured to correct. The ECC engine 1908 may also be configured to generate an uncorrectable error (UE) flag. The UE flag may be set when the ECC engine 1908 detects that a number of bit-errors have occurred greater than a number of bit-errors that the ECC engine 1908 is configured to correct. In a particular example, with SEC-DED, the CE flag may indicate that a single-bit error has been corrected while the UE flag may indicate that a two-bit error has occurred.

The ECC controller 1918 is configured to manage the error correction and associated error information. The ECC controller 1918 is configured to receive error information 1914 from the ECC engine. The error information 1914 may include information indicating whether there was no error, a correctable error, an uncorrectable error, a number of errors, or the like. The ECC controller 1918 may also be configured to receive the address 1906 associated with a read. Accordingly, the ECC controller 1918 may combine the error information 1914 from the ECC engine 1908 into new error information with the address 1906. As will be described in further detail below, the ECC controller 1918 may be configured to generate write data 1910 to be encoded by the ECC engine 1908 and written to the memory cell array 1901.

In an embodiment, the ECC controller 1918 may include a memory configured to store error information. For example, the ECC controller 1918 may include multiple registers in which error information may be stored. Any variety of error information may be stored in the ECC controller 1918. As will be described in further detail below, records of the error may be stored including information about an error. For example, the error record may include information, such as address information, type of error, the data read from the memory cell array 1901, whether a repair or other action has been performed, or the like.

In an embodiment, the ECC controller 1918 may be configured to transmit and receive communications 1926 from external devices. For example, the communications 1926 may include the transmission of error information. When a correctable error or an uncorrectable error occurs, error information may be transmitted by the ECC controller 1918. Such transmission may be in response to a request from an external device or may be spontaneous, such as according to a regular schedule, on the occurrence of the error, during a refresh cycle, or the like.

In an embodiment, the ECC controller 1918 may be configured to communicate over a bus, such as the SMBus to communicate the error information. In some embodiments, the memory device 1900 may include a command buffer 1928. The command buffer 1928 may be configured to buffer commands received through a bus for the ECC controller 1918.

In an embodiment, the memory device 1900 may include an SPD module 1930. The ECC controller 1918 may be configured to communicate with the SPD module 1930. The SPD module 1930 may be configured to perform operations associated with an SPD interface. In addition, the SPD module 1930 may be configured to allow access to the error information available through the ECC controller 1918. For example, particular commands received through at SPD module 1930 may be translated into appropriate commands and/or signals to access the error information stored in the ECC controller 1918.

DQS modifier 1920 is configured to modify a data strobe signal 1912 from the memory cell array 1901 in response to error information 1916 from the ECC engine 1908 and output the modified data strobe signal 1922. In a particular embodiment, the error information 1916 is a signal indicating whether an uncorrectable error has occurred. The DQS modifier 1920 may be configured to modify the data strobe signal 1912 such that the output data strobe signal 1922 does not toggle if the error information 1916 indicates that an uncorrectable error has occurred, but passes the data strobe signals 1912 as is if an uncorrectable error signal has not occurred. For example, the DQS modifier 1920 may include logic circuitry such as an OR gate, an AND gate, a NAND gate, a transmission gate or the like.

In an embodiment, the DQS modifier 1920 may be used to communicate time-sensitive information. For example, when an uncorrectable error has occurred, that error may be associated with a current read operation. While information regarding the uncorrectable error may be communicated by the ECC controller 1918 to external devices, such as by an SMBus, the communication path may be slower than a communication path for the data 1924. Thus, communication of the occurrence of the uncorrectable error may be delayed relative to the corresponding read operation. In contrast, communicating that an uncorrectable error has occurred by the DQS modifier 1920 may be substantially contemporaneous with the corresponding read operation. That is, the modified output data strobe signal 1922 is the data strobe signal associated with the transfer of data 1924 with the uncorrectable error.

Although particular components of a memory device 1900 have been used as an example, other components may be present. For example, the memory device 1900 may be configured to receive and/or transmit various strobe signals, selection signals, control signals, enable signals, or the like.

Figure 20:
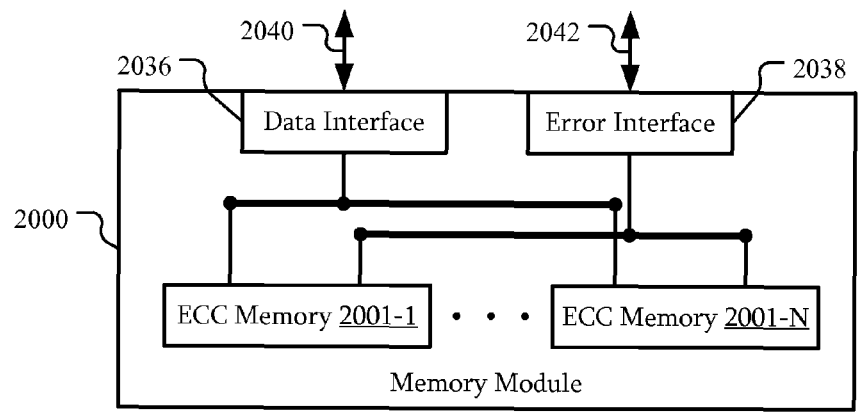
FIG. 20 is a schematic view of a memory module including memory devices according to an embodiment.

FIG. 20 is a schematic view of a memory module including memory devices according to an embodiment. In this embodiment, the memory module 2000 includes a data interface 2036 and an error interface 2038 similar to data interface 1536 and error interface 1538 of FIG. 15. In this embodiment, however, the memory module 2000 includes multiple ECC memory devices 2001-1 to 2001-N. The ECC memory devices 2001 may be any of the memory devices described herein, such as the memory devices 1800 and 1900 of FIGS. 18 and 19 described above.

Using memory device 1800 as an example of the memory devices 2001 and referring to FIGS. 18 and 20, each of the memory devices 1800 is coupled to the data interface 2036 and the error interface 2038. With respect to the data interface 2036, the data interfaces 1836 of the memory devices 1800 may form at least part of the data interface 2036. For example, data I/Os, strobe signals, or the like of each data interface 1836 may be aggregated into the data interface 2036. Address inputs and/or other control signals of the data interface 2036 may be distributed to the data interfaces 1836 of the memory devices 1800. Accordingly, data may be communicated to and from the memory devices 1800 through the data interface 2036 and hence, to and from the memory module 2000.

Similarly, the error interfaces 1838 may be coupled to the error interface 2038. The error interfaces 1838 may be coupled in a variety of ways. For example, the error interfaces 1838 and the error interface 2038 may be coupled to a common bus within the memory module 2000. In another example, the error interface 2038 may be coupled directly to each error interface 1838 of the memory devices 2001. The error interface 2038 may be configured to aggregate the error information from the memory devices 1800. Accordingly, error information may be communicated from the memory devices 1800 through the error interface 2038 and hence, from the memory module 2000.

Although the memory device 1800 of FIG. 18 has been used as an example of a memory device 2001 of the memory module 2000, in other embodiments, different memory devices may be used. For example, the memory device 1900 of FIG. 19 may be used as the memory devices 2001. Referring to FIG. 19, the address 1906, write data 1910, output data 1924, data strobe signal 1922, or the like of each memory device 1900 may be coupled to the data interface 2036. Similarly, the ECC controller 1918 of each memory device 1900 may be coupled to the error interface 2038.

Figure 21:
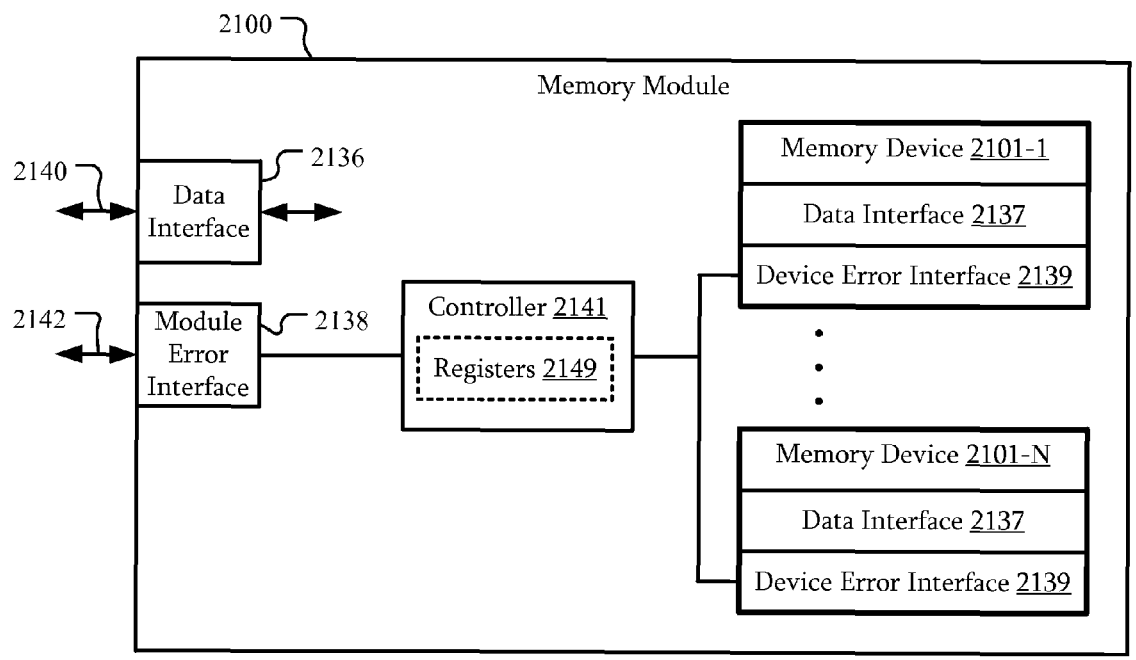
FIGS. 21-23 are schematic views of memory modules according to various embodiments.
Figure 22:
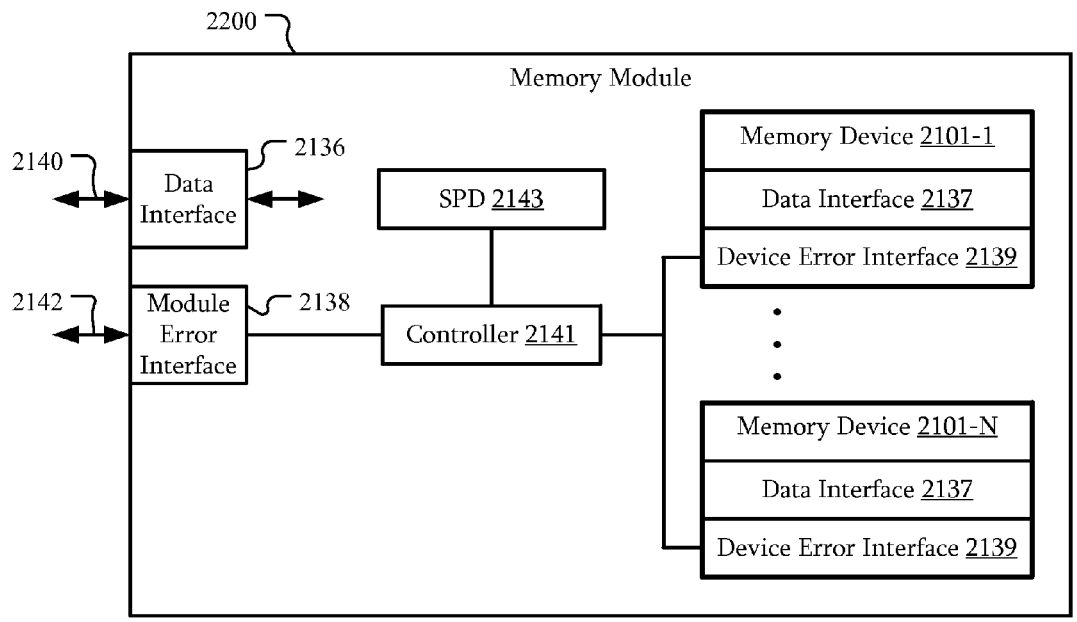
Figure 23:
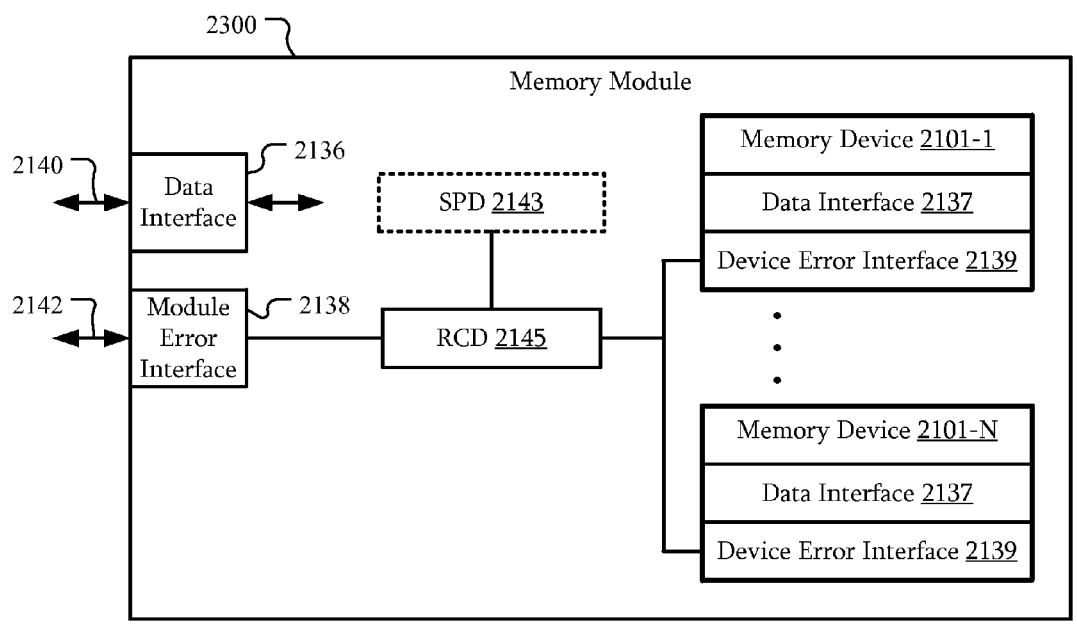

FIGS. 21-23 are schematic views of memory modules according to various embodiments. Referring to FIG. 21, in this embodiment, the memory module 2100 includes one or more memory devices 2101, a data interface 2136, and a controller 2141 similar to the one or more memory devices 1501, data interface 1536, and controller 1541 of FIG. 15. A module error interface 2138 may be similar to the error interface 1538 and configured to exchange information 2142 similar to information 1542; however the module error interface 2138 is referred to with the term "module" to distinguish it from the device error interfaces 2139 of the memory devices 2101. As will be described in further detail below, the module error interface 2138 may be used for communication other than communicating error information.

Here, the memory devices 2101 each have a data interface 2137 and a device error interface 2139 similar to data interface 1836 and error interface 1838 of FIG. 18. The data interfaces 2137 of the memory devices 2101 are coupled to the data interface 2136 of the module; however, such coupling is not illustrated for clarity. Moreover, in some embodiments, the coupling of the data interface 2136 and the data interfaces 2137 of the memory devices 2101 may, but need not pass through the controller 2141. For example, in some embodiments, data 2140 transferred to and from the memory module 2100 may be buffered in the controller 2141; however, in other embodiments, such transfers may bypass the controller 2141.

Each memory device 2101 is coupled to the module error interface 2138 and configured to communicate error information through the device error interface and the module error interface. In this embodiment, a controller 2141 is coupled to the device error interfaces 2139 and the module error interface 2138.

As will be described in further detail, the controller 2141 may be configured to manage communications involving the memory devices 2101, such as communications involving error information. For example, the controller 2141 may be configured to manage access to error information associated with the memory devices 2101 through the corresponding device error interfaces 2139, forward communications to and from the memory devices 2101, aggregate error information from the memory devices 2101, or the like.

In a particular embodiment, the controller 2141 may include registers 2149 that are accessible through the module error interface 2138. The controller 2141 may be configured to collect error information from the memory devices 2101 by communicating with the memory devices 2101 through the device error interfaces 2139. Such error information may be stored in the registers 2149 and accessible to devices external to the memory module 2100. Alternatively, the controller 2141 may be configured to combine the error information, summarize the error information, or the like. In particular, in an embodiment, each memory device 2101 may generate its own error information in isolation from the other memory devices 2101. Accordingly, as the controller 2141 may have access to all of the memory devices 2101, the controller 2141 may be configured to generate additional error information that an individual memory device 2101 may not be capable of generating. Although registers 2149 have been used as an example, error information and other information may be stored in the controller 2141 in other ways.

In an embodiment, the controller 2141 may be configured to receive commands related to the memory devices 2101. As described herein, the controller 2141 may be configured to receive a command to read error information. The controller 2141, however, may be configured to receive other types of communications related to the memory devices 2101. For example, the controller 2141 may be configured to receive commands related to maintenance of the memory devices 2101. An example of such maintenance may be a command to repair a memory cell within one or more of the memory device 2101, rewrite data, initiate a refresh cycle, or the like. The controller 2141 may be configured to receive such communications and, in response, communicate with the memory devices 2101.

Referring to FIG. 22, in this embodiment, the memory module 2200 is similar to the memory module 2100; however, the memory module 2200 includes a serial presence detect (SPD) 2143 module coupled to the controller 2141. The SPD 2143 may be configured to communicate through the controller 2141. For example, the controller 2141 may be configured to forward communications to and from the SPD 2143. In other embodiments, the controller 2141 may be configured to obtain information from the SPD 2143 and operate as a proxy for the SPD 2143 using such information through the module error interface 2138. Again, although the module error interface 2138 uses the term "error," information other than error information may be transmitted and received through the module error interface 2138.

In an embodiment, the controller 2141 may be configured to respond to an address associated with the SPD 2143. The controller 2141, however, may be configured to respond to another address, use additional information in a communication, or the like to determine whether the communication is intended for the SPD 2143, intended to access error information, intended for the memory devices 2101, intended for the controller 2141 itself, or the like.

Referring to FIG. 23, in this embodiment, the memory module 2300 may be similar to the memory module 2100 of FIG. 21 or the memory module 2200 of FIG. 22. A registering clock driver (RCD) module 2145, however, may be used in place of the controller 2141. Here, the RCD 2145 may be configured to buffer data transferred to and from the memory module 2300. In addition, the RCD 2145 may also be configured to provide functions described herein with respect to the controller 2141.

An SPD 2143 may also be coupled to the RCD 2145. Accordingly, similar to the memory module 2200, the SPD 2143 may be accessible through the RCD 2145, the RCD 2145 may act as a proxy for the SPD 2143, or the like, similar to the controller 2141 described above.

Figure 24:
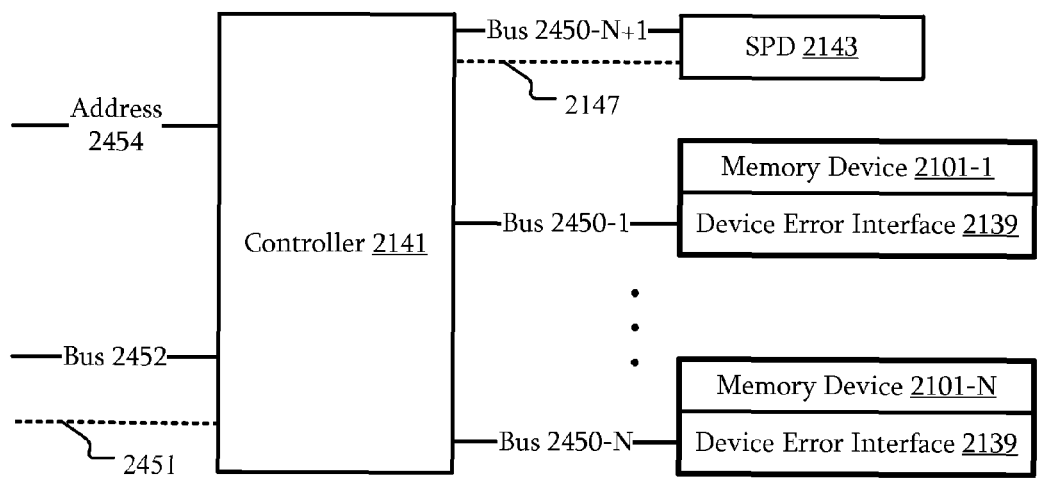
FIGS. 24-26 are schematic views of portions of memory modules according to various embodiments.
Figure 25A:
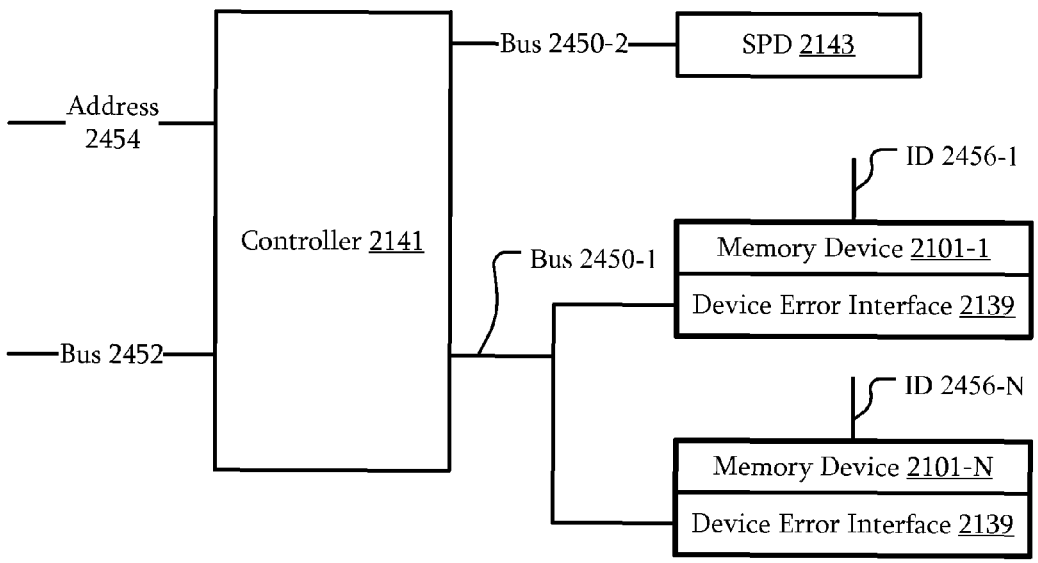
Figure 25B:
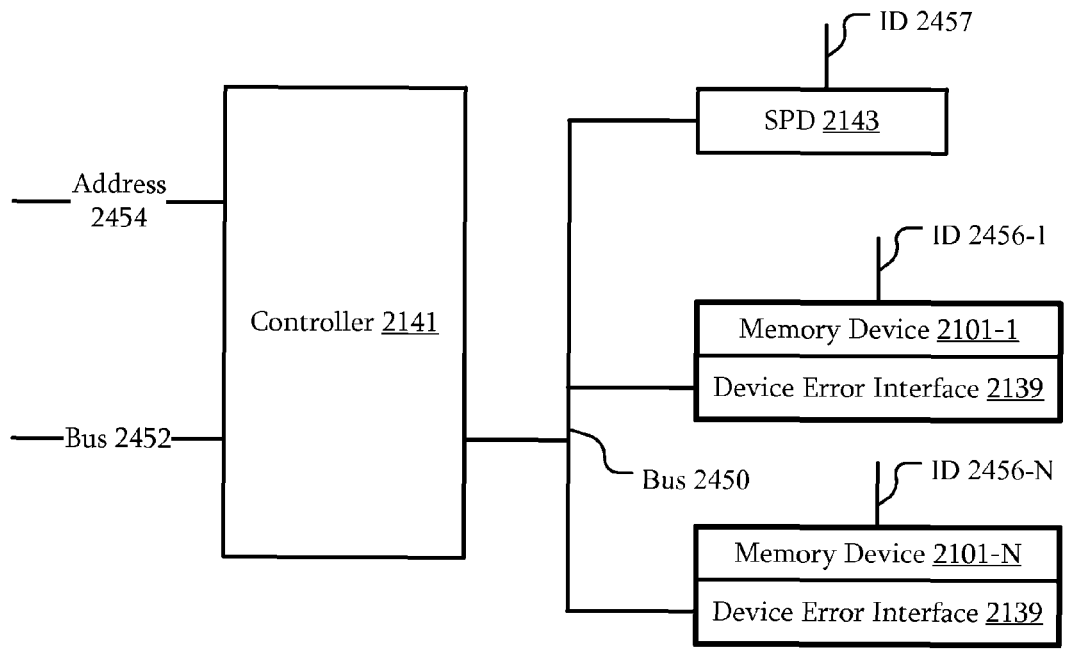
Figure 26:
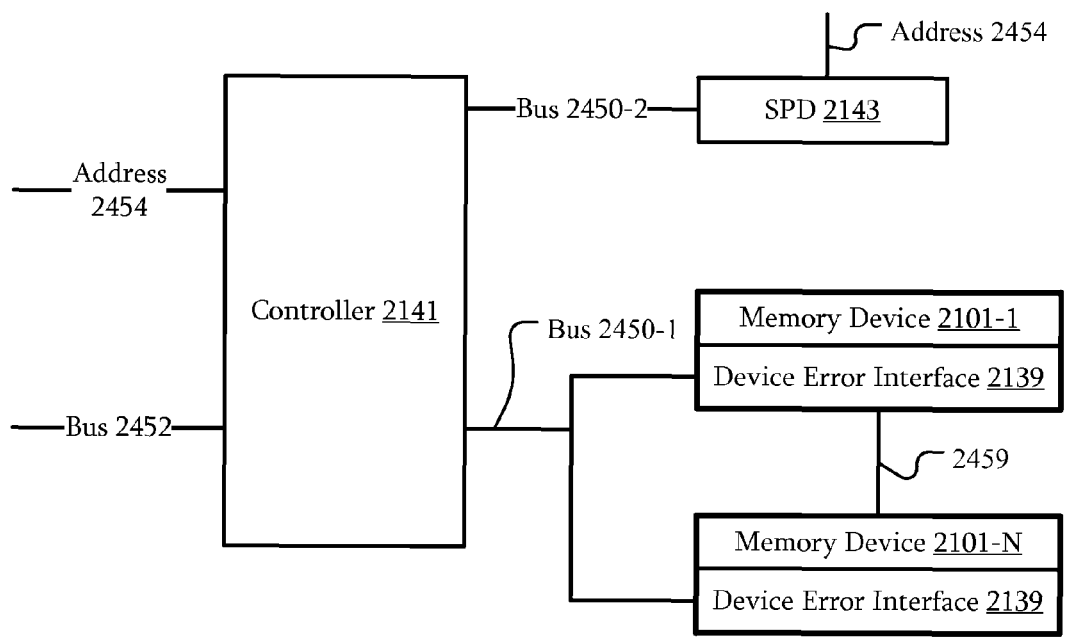

FIGS. 24-26 are schematic views of portions of memory modules according to various embodiments. Referring to FIG. 24, in this embodiment, the controller 2141, memory devices 2101, and the SPD 2143 may be similar to those of FIG. 22. The controller 2141 may be coupled to a bus 2452. The bus 2542 may be an SMBus, or other bus as described herein. The bus 2542 may form part or all of the module error interface 2142.

The controller 2141 may be configured to receive an address 2454. The address 2454 may be a hardwired input. In a particular example, the address 2454 may be a series of pins on a memory module that, when inserted in a particular socket, are connected to high or low values to distinguish the memory module from others coupled to the same bus 2542.

In an embodiment, the address 2454 may be the address that is coupled to an SPD module in conventional memory devices; however, here, the address is repurposed to communicate with the controller 2141 instead of an SPD such as the SPD 2143. Thus, a memory module as described herein may be pin-compatible with existing memory modules.

In this embodiment, the SPD 2143 and the memory devices 2101 are each coupled to the controller 2141 through separate busses 2450. Here, the busses are labeled bus 2450-1 to 2450-N, corresponding to memory devices 2101-1 to 2101-N. Bus 2450-N+1 corresponds to the additional bus coupling the controller 2141 and the SPD 2143. In a particular embodiment, each of the busses 2450 may be SMBus busses or other similar communication links. In other embodiments, however, other point-to-point communication links may be used in place of the busses 2450 including, for example, a communication link that may only have two endpoints. That is, although the term bus has been used, the communication link may be configured to only be able to couple to two devices.

In an embodiment, the SPD 2143 may be configured to respond to and/or generate a control signal 2147. The control signal 2147 may include an out-of band signal with respect to the bus 2450-N+1. The control signal 2147 may be an interrupt signal, for example. In a particular, embodiment, the control signal 2147 may be an event signal associated with the SPD 2143. The controller 2141 may also be configured to receive and/or generate a control signal 2451. The control signal 2451 may be a signal that would otherwise be used by the SPD 2143. Since the controller 2141, however, may be configured to use the interface that the SPD 2143 otherwise would have, the SPD 2143 may not be configured to directly receive the control signal 2451. Accordingly, the controller 2141 may be configured to communicate the control signal 2451 to and/or from the SPD 2143 as the control signal 2147. Although a single control signal associated with the SPD has been used as an example, in other embodiments, multiple control signals may be forwarded to and from the SPD 2143, the memory devices 2101, or other components. For clarity such control signals will not be illustrated in subsequent figures; however, they may be present.

Moreover, the controller 2141 may include additional functions beyond the SPD 2143 that may be associated with a control signal similar to control signal 2147. For example, the controller 2141 may be configured to generate an interrupt based on error information from the memory devices 2101. Accordingly, control signal 2451 may be used to communicate the error information based interrupt in addition to any such signal from the SPD 2143. The controller 2141 may be configured to determine whether such control signal is intended for the controller 2141, the SPD 2143, or the like.

In an embodiment, a number of additional pins may be used for the memory devices 2101. In a particular embodiment, a memory device 2101 may include two additional pins, one for a clock signal and another for a data signal. The controller 2141 may include 2×(N+2) pins for the busses 2452 and 2450-1 to 2450-N+1, three pins for the address 2454, and two pins for the control signals 2451 and 2147.

Referring to FIG. 25A, in this embodiment, the controller 2141, memory devices 2101, and the SPD 2143 may be similar to those of FIG. 24. The controller 2141, however, is coupled to the memory devices 2101 through bus 2450-1 and coupled to the SPD 2143 through bus 2450-2. In this embodiment, the busses 2450-1 and 2450-2 are separate busses.

In addition, the bus 2450-1 is a common bus for the memory devices 2101. Once again, the busses 2450 may be SMBus busses. Since multiple memory devices 2101 may be coupled to the bus 2450-1, each memory device 2101 may include a corresponding ID input 2456. The ID 2456 may be similar to the address 2454. For example, for each memory device 2101, the corresponding ID 2456 may be hardwired to an address unique among the memory devices 2101. In a particular example, each ID 2456 may include four pins that may be held either high or low. Accordingly, 16 unique addresses are available for the IDs 2456. Although four pins have been used as an example, any number of pins may be used to distinguish any number of memory devices 2101.

Each of the memory devices 2101 may be configured to transform the corresponding ID 2456 into an address or other identifier to be used on the bus 2450-1. In an embodiment, the address generated from the ID 2456 may be an address used as the slave address for an SMBus. In this embodiment, the SPD 2143 and the controller 2141 may be the only devices on the bus 2450-2. Accordingly, an address input need not be used for the SPD 2143.

In an embodiment, a number of additional pins may be used for the memory devices 2101. In a particular embodiment, a memory device 2101 may include two additional pins, one for a clock signal and another for a data signal, similar to FIG. 24, but also four pins for the IDs 2456. The controller 2141 may include six pins for the busses 2452, 2450-1, and 2450-2, three pins for the address 2454, and two pins for the control signals 2451 and 2147 similar to FIG. 24, if used.

Referring to FIG. 25B, in this embodiment, the controller 2141, memory devices 2101, and the SPD 2143 may be similar to those of FIG. 25A. The SPD 2143 and the memory devices 2101, however, are coupled to the controller 2141 through a common bus 2450. As described above, the memory devices 2101 may each be configured to receive an ID 2456. Since the SPD 2143 is now on the same bus 2450 as the memory devices 2101, the SPD 2143 may be configured to use an address that is unique among the SPD 2143 and the memory devices 2101. The SPD 2143 may be configured to receive an ID 2457. The SPD 2143 may be configured to convert the ID 2457 into an address to use on the bus 2450.

In an embodiment, the form of the ID 2457 may be different from the IDs 2456. For example, the ID 2457 may include three pins used to indicate the address of the SPD 243 while the IDs 2456 may each include four pins. Moreover, IDs on the ID 2457 and the IDs 2456 may, but need not correspond to the same address. For example, an ID 2457 of 010b and an ID 2456 of 0010b may correspond to different addresses.

In an embodiment, a number of additional pins may be used for the memory devices 2101. In a particular embodiment, a memory device 2101 may include two additional pins, one for a clock signal and another for a data signal, similar to FIG. 24, but also four pins for the IDs 2456. The controller 2141 may include four pins for the busses 2450 and 2452, three pins for the address 2454, and two pins for the control signals 2451 and 2147 similar to FIG. 24, if used.

Referring to FIG. 26, in this embodiment, the controller 2141, memory devices 2101, and the SPD 2143 may be similar to those of FIG. 25B. The SPD 2143 is configured to receive the address 2454 similar to the controller 2141. In this embodiment, however, the memory devices 2101 are not configured to receive IDs 2456. In contrast, the memory devices 2101 are each coupled to a common bus 2459, such as a single wire or net separate from the bus 2450-1. In an embodiment, the common bus 2459 may be a daisy-chain link.

In an embodiment, the memory devices 2101 may be coupled to a bus 2459. The memory devices 2101 are configured to determine if information received through the controller 2141 is associated with the memory device 2101 in response to a signal received through the bus 2459. In an embodiment, the memory devices 2101 may be configured to communicate over the bus 2459 to establish the addresses of the memory devices 2101 on the bus 2450. For example, a first memory device may determine its address in response to a counter and increment the counter. The value of the counter is transmitted to a second memory device 2101. The second memory device 2101 is also configured to determine its address in response to the counter and increment the counter. This procedure may continue until each memory device 2101 has a unique address.

In an embodiment, a number of additional pins may be used for the memory devices 2101. In a particular embodiment, a memory device 2101 may include two additional pins, one for a clock signal and another for a data signal, similar to FIG. 24, but also one additional pin for the bus 2459. The controller 2141 may include six pins for the busses 2452, 2450-1, and 2450-2, three pins for the address 2454, and two pins for the control signals 2451 and 2147 similar to FIG. 24, if used.

In an embodiment, in any of the above configurations, the controller 2141 may be configured to determine the addresses of the memory devices 2101 and the SPD 2143, if coupled to the same bus. For example, the controller 2141 may be configured to use the SMBus address resolution protocol to dynamically assign addresses to the memory devices 2101 and the SPD 2143. Although one technique of determining the addresses on one type of bus has been used as an example, other techniques may be used as appropriate to the particular bus 2450.

Figure 27:
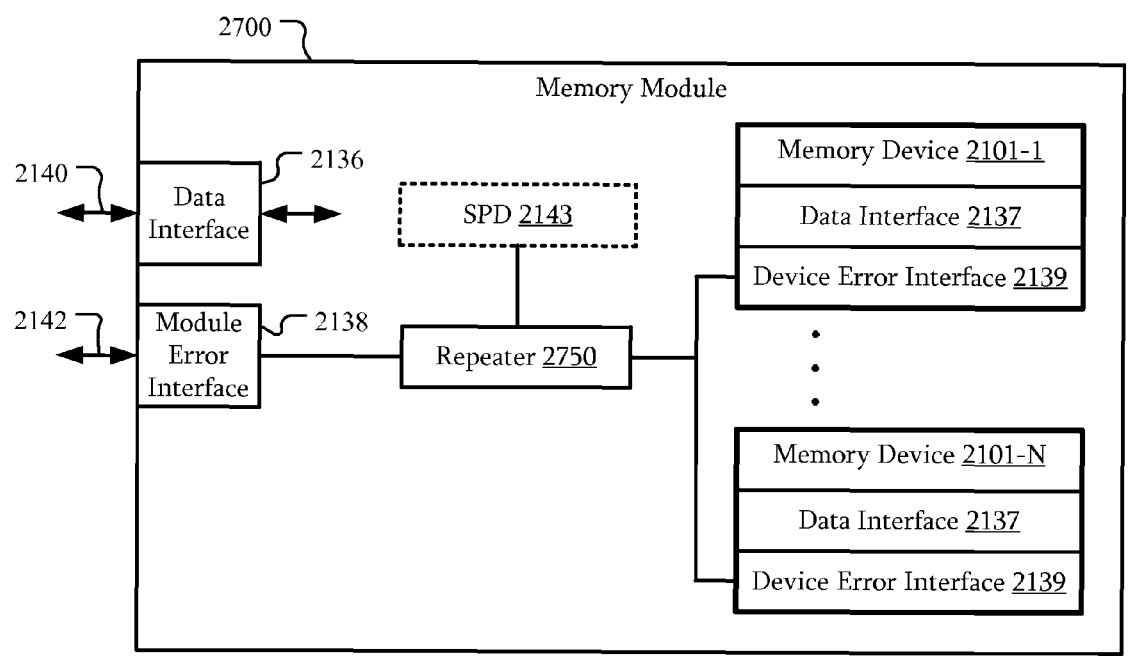
FIG. 27 is a schematic view of a memory module according to another embodiment.

FIG. 27 is a schematic view of a memory module according to another embodiment. In this embodiment, the memory module 2700 is similar to the memory module 2100 of FIG. 21. A repeater 2750, however, is used as the controller 2141. The repeater 2750 may be configured to extend the communication link coupled to the module error interface 2138 so that the error interfaces 2139 of the memory devices 2101 and an SPD 2143, if present, may be coupled to the communication link. In a first example, if the loading of the memory devices 2101 and/or attributes of the network allow, the repeater 2750 may merely be wires, such as wires of a shared medium. In another example, the repeater 2750 may include a device configured to allow more devices to be attached to the bus, allow a longer bus, or the like. Although the term repeater has been used, the repeater 2750 may also include a hub, extender, switch, bridge, or the like. And device that can extend a network may be used as the repeater 2750. As the memory devices 2101 may be directly accessible through the module interface 2138, each memory device 2101 of a memory module 2700 may be individually interrogated for error information by an external controller as described above, such as a BMC.

In an embodiment, a configuration of the memory devices 2101, an SPD 2143 and the repeater 2750 may be similar to that of FIG. 25B. That is, referring to FIGS. 25B and 27, the memory devices 2101 may be each coupled to the bus 2450, which is also coupled to the repeater 2750. Each of the memory devices 2101 may also be configured to receive an ID 2456. As a result, the memory devices 2101 may be configured to determine their respective addresses for use on the bus 2450.

In an embodiment, particular addresses or IDs may be associated with various types of devices. For example, temperature sensors may be associated with a particular address or address range. The memory devices 2101, however, may not have such an address or ID association. Accordingly, an address, ID, range of such parameters, or the like may be repurposed from other types of devices, such as devices that are not used in a system that may use the memory modules described herein. For example, an ID or address for an I2C mux may be used as the ID or address of the memory devices 2101.

In an embodiment, a memory system architecture utilizing a coupled in-DRAM ECC can use an Operating System (OS) driver provide an address-conversion technique that converts a device address (DA) to physical address (PA) independent of a central processing unit/memory controller (CPU/MC). Thus, a coupled in-DRAM ECC memory system architecture as disclosed herein can replace a computing system architecture that uses a high-cost CPU, such as a XEON CPU, with lower-cost CORE/ARM CPU. Moreover, a Reliability, Availability and Serviceability (RAS) capability can be transferred from a system CPU to a memory system, thereby providing significant end customer total cost of ownership (TCO) cost reduction.

Figure 28:
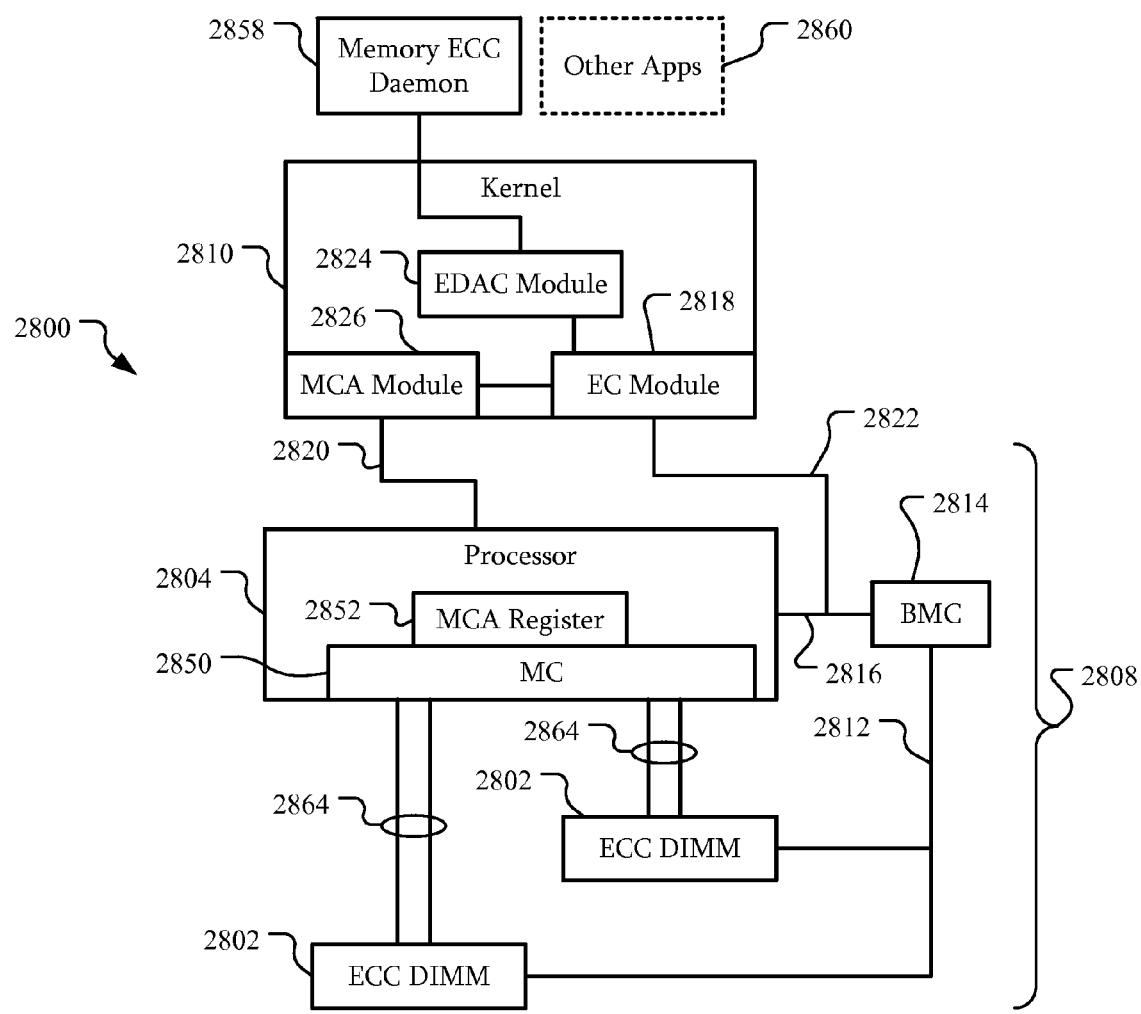
FIG. 28 is a schematic view of a system with a memory system architecture with in-DRAM error correction and that provides device address (DA) to physical address (PA) conversion according to an embodiment.

FIG. 28 is a schematic view of a system with a memory system architecture with in-DRAM error correction and that provides device address (DA) to physical address (PA) conversion according to an embodiment. In this embodiment, the system 2800 includes memories 2802, a processor 2804, kernel 2810 with an EC module 2818 and an MCA module 2826 responsive to information 2820 and 2822 similar to the memory 1002, processor 1004, and software 1010 with the EC module 1018 and MCA module 1026 responsive to information 1020 and 1022 of FIG. 10, and similar to memory 1302, processor 1304, and software 1310 with EC module 1318 and MCA module 1326 of FIG. 13. In this embodiment, like the embodiment of FIG. 13, each of the memories 2802 is error correction code (ECC) dual in-line memory module (DIMM). Each ECC DIMM 2802 is configured to store data and correct at least an error in the stored data. In this embodiment, the ECC DIMMs 2802 are each coupled to a memory controller (MC) 2850 of the processor 2804 through corresponding communication paths 2864. The communication paths 2864 include at least lines for data signals and data strobe signals or the like similar to the communication path 506 of FIG. 5. The ECC DIMMs 2802 are each coupled to the processor 2804 through a communication path 2808 including a bus 2812 and a BMC 2814, and a bus 2816 similar to the bus 312 and BMC 314 of FIG. 3. Communication path 2808 also includes a bus 2822 coupled between BMC 2814 and EC module 2818. In one exemplary embodiment, bus 2822 is part of a System Management Bus (SMBus). In one exemplary embodiment, EC module 2818 interfaces to bus 2822 through an Intelligent Platform Management Interface (IPMI).

In an embodiment, the ECC DIMMs 2802 may be configured to correct one or more errors in data read from the ECC DIMMs 2802. The error correction techniques may include a single error correction-double error detection (SEC-DEC) technique, a single-chip chipkill technique, a double-chip chipkill technique, or the like. Any error correction technique may be used.

In this embodiment, the memory controller (MC) 2850 is not configured to perform error correction or alternatively, is not configured to receive error information from the ECC DIMMs 2802. As the data passed from the ECC DIMMs 2802 is already corrected, the MC 2850 may not even receive any information representing a correctible error. The error information and, in particular, corrected error information, however, may be transmitted to the processor 2804 through the communication path 2808, i.e., through the busses 2812 and 2822, and the BMC 2814. Further, the memory controller (MC) 2850 may not be configured to convert a device address (DA) of a memory 1302 to physical address (PA) for kernel 2810.

In an embodiment, the processor 2804 may be an existing processor that is otherwise not capable of performing error correction, but has an interface capable of connecting to the bus 2822. Once, however, the processor 2804 is configured by the kernel 2810 and, in particular, the EC module 2818, the overall system 2800 may be configured to perform error correction similar to a system having a processor capable of error correction, and may be configured to perform device address (DA) to physical address (PA) conversion.

In an embodiment, the EC module 2818 may create a virtual memory controller with ECC interface. For example, as described above, the EC module 2818 may be configured to receive information from the MCA module 2826. That information may include information that an actual memory controller with ECC interface may provide without some or all error information. The EC module 2818 may supplement the information from the MCA module 2826 with the error information to create a complete set of information expected from a memory controller with ECC interface. As a result, the EDAC module 2824, a memory ECC daemon 2858, other applications 2860, or the like may be used without change from those used with processors with error correction. For example, the EDAC module 2824 may be configured to poll the EC module 2818 for memory ECC information. In return, the EC module 2818 may return the error information received through the second communication path 2808. The memory ECC daemon 2858, in communication with the EDAC module 2824, may poll the EDAC module 2824 for error information. The memory ECC daemon 2858 may then take actions according to the error information at an application level. Such actions may include page retirement, other actions to manage errors to keep the system 2800 running, maintain a level of reliability, recommend decommissioning, or the like.

In an embodiment, an address-conversion technique is provided for coupled in-DRAM ECC memory systems to convert a device address (DA) to physical address (PA) translation independent of a CPU memory controller. During boot up of EC module 2818, a shell script delivers device address to physical address (DA-to-PA) conversion table information to EC module 2818. The DA-to-PA conversion table information is based on the particular CPU 2818 and the Basic Input/Output System (BIOS) in use. During system operation, device addresses (DA) of memory 2802 are converted to physical addresses (PA) by EC module 2818 for kernel 2810 using the DA-to-PA conversion table information.

Figure 29:
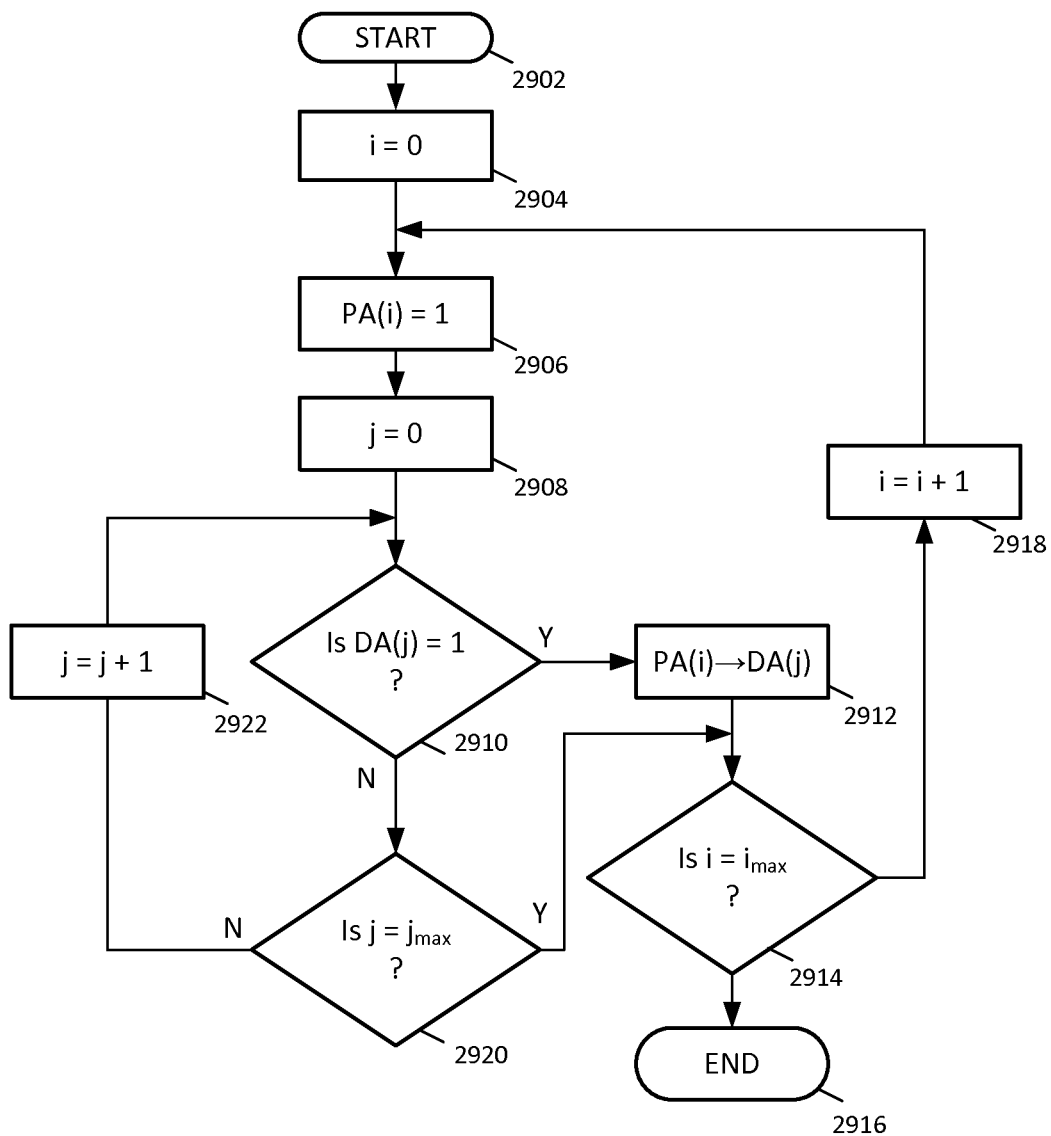
FIG. 29 is a flowchart 2900 of a technique of generating DA-to-PA conversion information for a non-XOR mapping configuration according to an embodiment.

In one exemplary embodiment, the DA-to-PA conversion information is generated during a test operation to provide a DA-to-PA conversion table. FIG. 29 is a flowchart 2900 of an exemplary technique of generating DA-to-PA conversion information for a non-XOR mapping configuration according to an embodiment. The process of FIG. 29 toggles a physical address one bit at a time and determines which device address bit toggles to thereby generate DA-to-PA conversion information. Search complexity is O(n), 1 bit per one search, and is therefore relatively compute-inexpensive. The process begins at operation 2902. Flow continues to operation 2904 where an index i is set equal to 0. At operation 2906, physical address PA(i) of memory 2802 is accessed (i.e., PA(i)=1). At operation 2908, an index j is set equal to 0. At operation 2910, it is determined whether device address DA(j) is true (i.e., DA(j)=1) as a result of accessing physical memory PA(i).

If, at operation 2910, it is determined that device address DA(j) is true, flow continues to operation 2912 where DA-to-PA conversion information is stored for PA(i) being mapped onto DA(j) for the particular indices i and j. In one embodiment, determining whether PA(i) is mapped on to DA(j) is done using, for example, a logic analyzer coupled to the address lines of system 2800. Flow continues to operation 2914 where it is determined whether index i is equal to the maximum physical address of system 2800 (i.e., $i_{max}$). If, at operation 2914, index i is equal to $i_{max}$, flow continues to operation 2916 where the process ends and a DA-to-PA conversion table can be formed, otherwise flow continues to operation 2918 where index i is incremented. Flow returns to operation 2906.

If, at operation 2910, it is determined that the device address DA(j) is not true, flow continues to operation 2920 where it is determined whether index j is equal to the maximum device address for the system (i.e., $j_{max}$). If, at operation 2920, index j is equal to $j_{max}$, flow continues to operation 2914. If, at operation 2920, index j is not equal to $j_{max}$, flow continues to operation 2922 where index j is incremented. Flow returns to operation 2910.

Figure 30A:
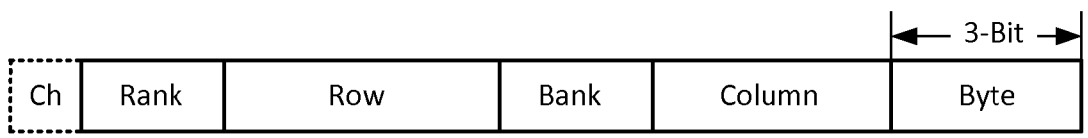
FIG. 30A depicts the type of address conversion information that is stored for each DA address when DA(j) is determined to be true for a memory 2802 operating in a single channel/dual asymmetric mode according to an embodiment.
Figure 30B:
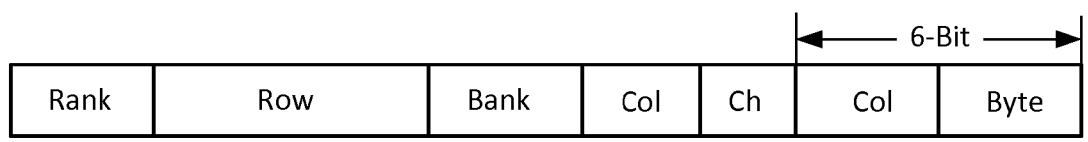
FIG. 30B depicts the type of address conversion information that is stored for each DA address when DA(j) is determined to be true for a memory 2802 operating in a dual channel symmetric mode according to an embodiment.

FIG. 30A depicts the type of address conversion information that is stored for each DA address when DA(j) is determined to be true for a memory 2802 operating in a single channel/dual asymmetric mode according to an embodiment. As depicted FIG. 30A, the bank index is mapped from the middle order bits, while channel and rank index are mapped from higher order bits to account for data being interleaved across several SDRAM banks in order to provide adequate bandwidth for a processor. Channel index is mapped from the highest address bit, thereby leaving two independent channels. FIG. 30B depicts the type of address conversion information that is stored for each DA address when DA(j) is determined to be true for a memory 2802 operating in a dual channel symmetric mode according to an embodiment. In the dual channel symmetric mode, bit{6} is used as the channel index. Depending on which mode is used in an embodiment, the stored address conversion information depicted in either FIG. 30A or FIG. 30B is hard coded into the BIOS of the system and is transferred to the EC module 2818 during boot up of the EC module 2818.

Figure 31:
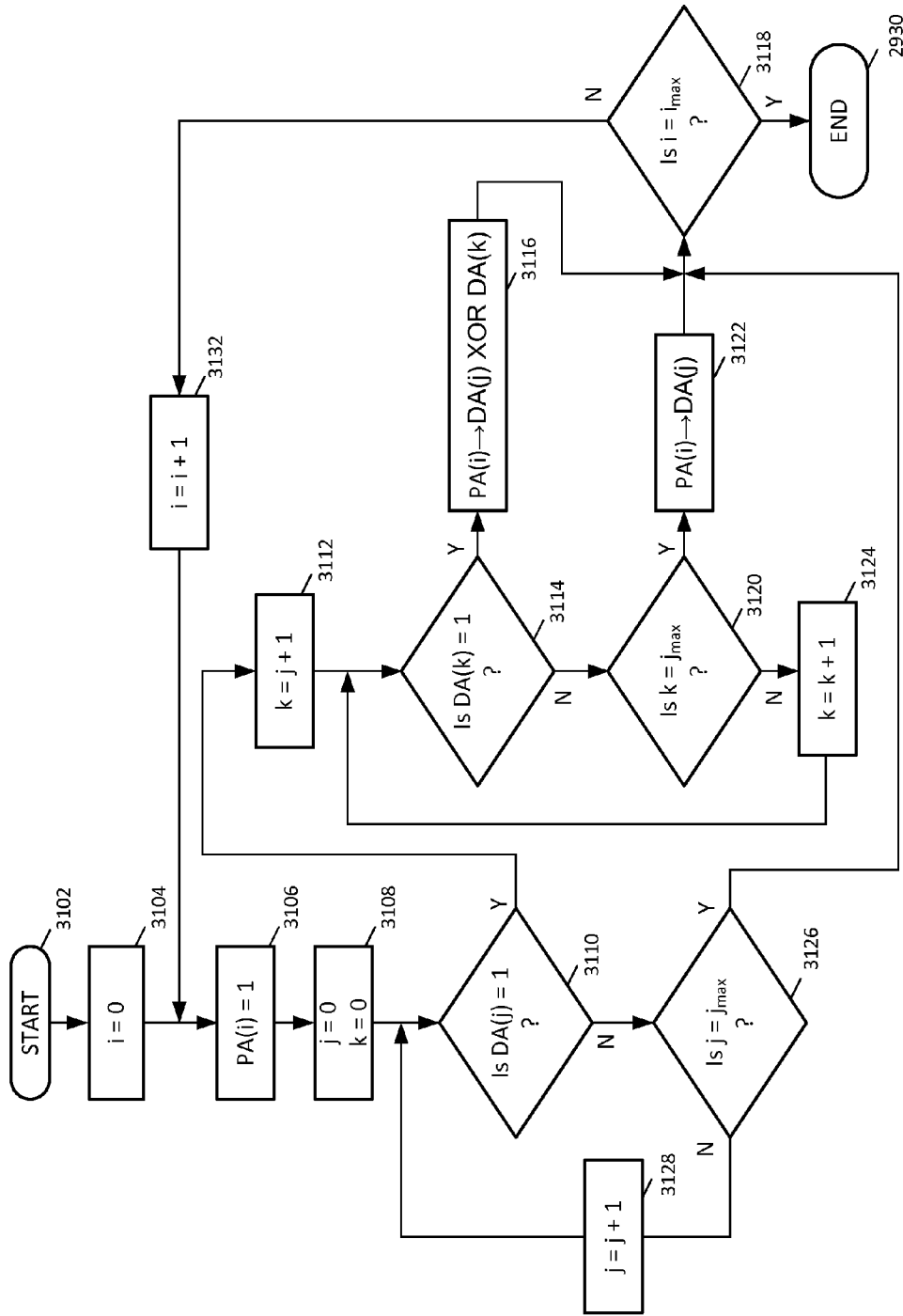
FIG. 31 is a flowchart 3100 of a technique of generating DA-to-PA conversion information for an XOR mapping configuration according to an embodiment.

FIG. 31 is a flowchart 3100 of an exemplary technique of generating DA-to-PA conversion information for an XOR mapping configuration according to an embodiment. In one exemplary embodiment, the DA-to-PA conversion information generated by this process is generated during a test operation. The process toggles a physical address one bit at a time, and checks which device address bit toggles to generate DA-to-PA conversion information. Search complexity for the XOR mapping configuration is O(n), 1 bit per one search, and is therefore relatively compute-inexpensive. The process begins at operation 3102. Flow continues to operation 3104 where an index i is set equal to 0. At operation 3106, physical address PA(i) of memory 2802 is accessed (i.e., PA(i)=1). At operation 3108, an index j is set equal to 0, and an index k is set equal to 0. At operation 3110, it is determined whether device address DA(j) is true (i.e., DA(j)=1).

If, at operation 3110, it is determined that device address DA(j) is true, flow continues to operation 3112 where index k is set equal to j+1. Flow continues to operation 3114 where it is determined whether device address DA(k) is true (i.e., DA(k)=1). In one embodiment, determining whether PA(i) is mapped on to DA(k) is done using, for example, a logic analyzer coupled to the address lines of system 2800. If, at operation 3114, it is determined that DA(k)=1, flow continues to operation 3116 where physical address PA(i) is mapped on to device address DA(j) XOR DA(k) and the address conversion information is stored. Flow continues to operation 3118.

If, at operation 3114, it is determined that device DA(k) is not true (i.e., DA(k)≠1, then flow continues to operation 3120 where it is determined whether index k is equal to the maximum device address for the system (i.e., $j_{max}$). If so, flow continues to operation 3122 where physical address PA(i) is mapped onto device address DA(j) (i.e., $j_{max}$) and the address conversion information is stored. Flow continues to operation 3118.

In, at operation 3120, it is determined that index k is not equal to $j_{max}$, flow continues to operation 3124 where index k is incremented. Flow returns to operation 3114.

If, at operation 3110, it is determined that the device address DA(j) is not true, flow continues to operation 3126 where it is determined whether index j is equal to the maximum device address for the system (i.e., $j_{max}$). If, at operation 3126, index j is equal to $j_{max}$, flow continues to operation 3118. If, at operation 3126, index j is not equal to $j_{max}$, flow continues to operation 3128 where index j is incremented. Flow returns to operation 3110.

At operation 3118, it is determined whether index i is equal to $i_{max}$, if so, flow continues to operation 3130 where the process ends, otherwise flow continues to operation 3132 where index i is incremented, and flow returns to operation 3106.

Figure 32:
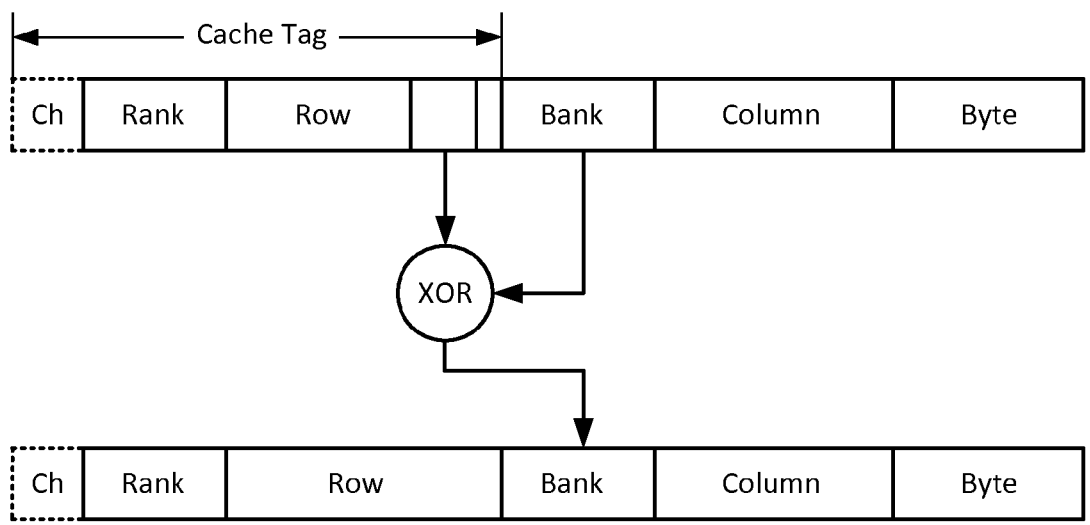
FIG. 32 depicts the type of address conversion information that is stored for each DA address when DA(k) is determined to be true for a memory system having an XOR mapping configuration according to an embodiment.

FIG. 32 depicts the type of address conversion information that is stored for each DA address when DA(k) is determined to be true for a memory system having an XOR mapping configuration according to an embodiment. In one exemplary embodiment, the XOR mapping configuration depicted in FIG. 32 includes a permutation-based page interleaving mapping technique. The permutation-based page interleaving technique exclusive ORs (XORs) the bank index with a range of row index bits that correspond to the lowest bits of an L2 cache tag in a cache address to convert row conflicts due mainly to L2 conflict misses into accesses to different banks to reduce a row conflict rate and preserve spatial locality in the SDRAM rows. The stored address conversion information depicted in FIG. 32 is hard coded into the BIOS of the system and is transferred to the EC module 2818 during boot up of the EC module 2818.

Figure 33:
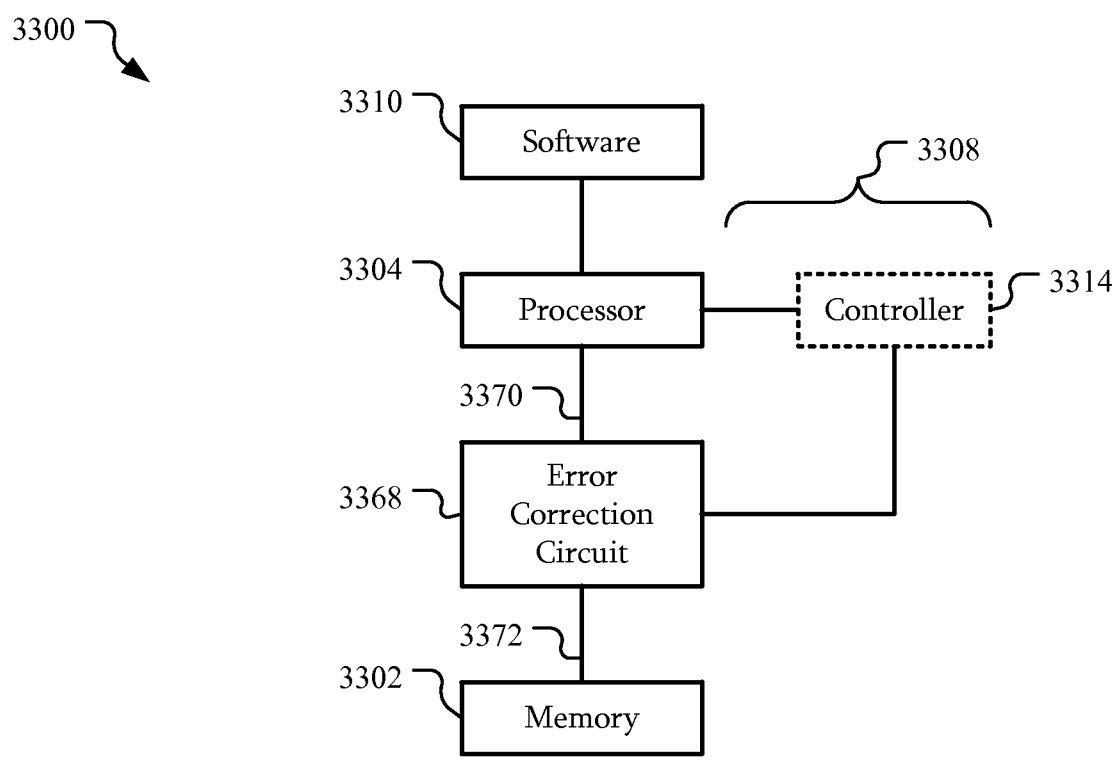
FIG. 33 is a schematic view of a system with a memory system architecture according to an embodiment.

FIG. 33 is a schematic view of a system with a memory system architecture according to an embodiment. In this embodiment, the system 3300 includes a processor 3304 and software 3310 similar to the processor 104 and software 110 of FIG. 1. In this embodiment, however, the system 3300 includes a memory 3302 and an error correction circuit 3368.

In this embodiment, the memory 3302 is not configured to correct errors. The memory is coupled to the error correction circuit 3368 and is configured to transmit data to the error correction circuit through communication path 3372.

The error correction circuit 3368 is configured to correct errors in data received from the memory 3302. The error correction circuit 3368 is coupled to the processor 3304 through a second communication path 3370 and a third communication path 3308. The second communication path 3370 is the main path through which the processor 3304 is configured to receive data. For example, the second communication path 3370 may be a system bus for the processor 3304.

In contrast, the third communication path 3308 is similar to the communication path 108 or the like described above. That is, the third communication path 3308 may be a separate, out-of-band communication path, include a controller 3314, or have other variations similar to the communication paths described above.

Figure 34:
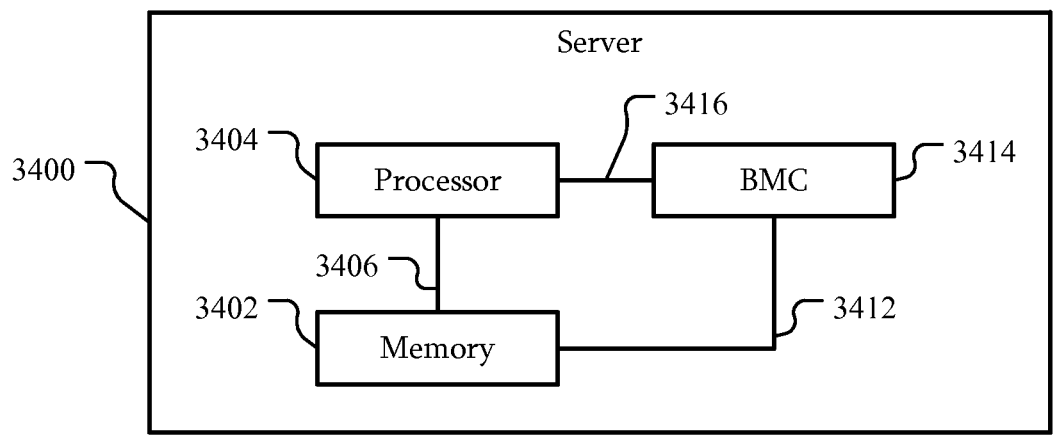
FIG. 34 is a schematic view of a server according to an embodiment.

FIG. 34 is a schematic view of a server according to an embodiment. In this embodiment, the server 3400 may include a stand-alone server, a rack-mounted server, a blade server, or the like. The server 3400 includes a memory 3402, a processor 3404, and a BMC 3414. The processor 3404 is coupled to the memory 3402 through the communication path 3406. The BMC is coupled to the processor 3404 through the bus 3416 and coupled to the memory 3402 through the bus 3412. The memory 3402, processor 3404, BMC 3414, communication path 3406, and busses 3412 and 3416 may be any of the above described corresponding components.

Figure 35:
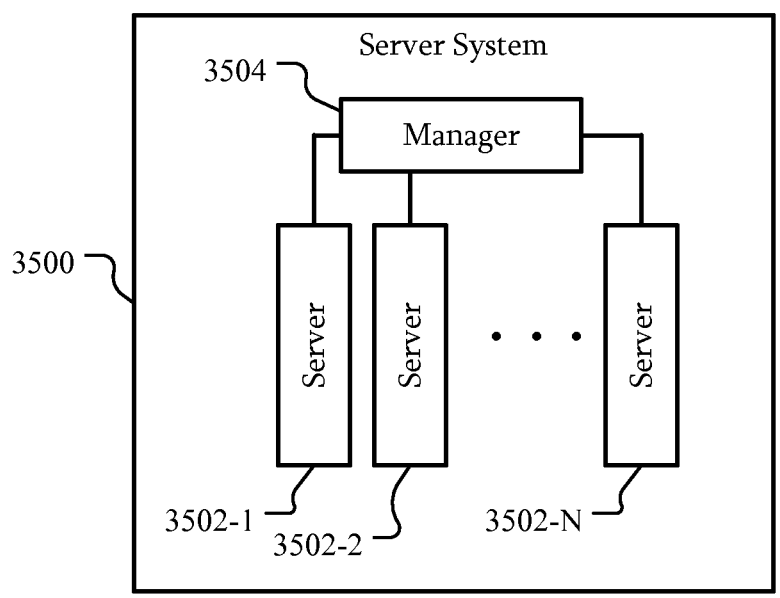
FIG. 35 is a schematic view of a server system according to an embodiment.

FIG. 35 is a schematic view of a server system according to an embodiment. In this embodiment, the server system 3500 includes multiple servers 3502-1 to 3502-N. The servers 3502 are each coupled to a manager 3504. One or more of the servers 3502 may be similar to the server 3300 described above. In addition, the manager 3504 may include a system with a memory system architecture as described above.

The manager 3504 is configured to manage the servers 3502 and other components of the server system 3500. For example, the manager 3504 may be configured to manage the configurations of the servers 3502. Each server 3502 is configured to communicate error information to the manager 3504. The error information may include correctible error information communicated to a processor in one of the servers 3502 as described above or other error information based on the correctible error information. The manager 3504 may be configured to take actions based on that error information. For example, server 3502-1 may have a number of correctible errors that exceeds a threshold. The manager 3504 may be configured to transfer the functions of that server 3502-1 to server 3502-2 and shutdown server 3502-1 for maintenance and/or replacement. Although a particular example has been given, the manager 3504 may be configured to take other actions based on the error information.

Figure 36:
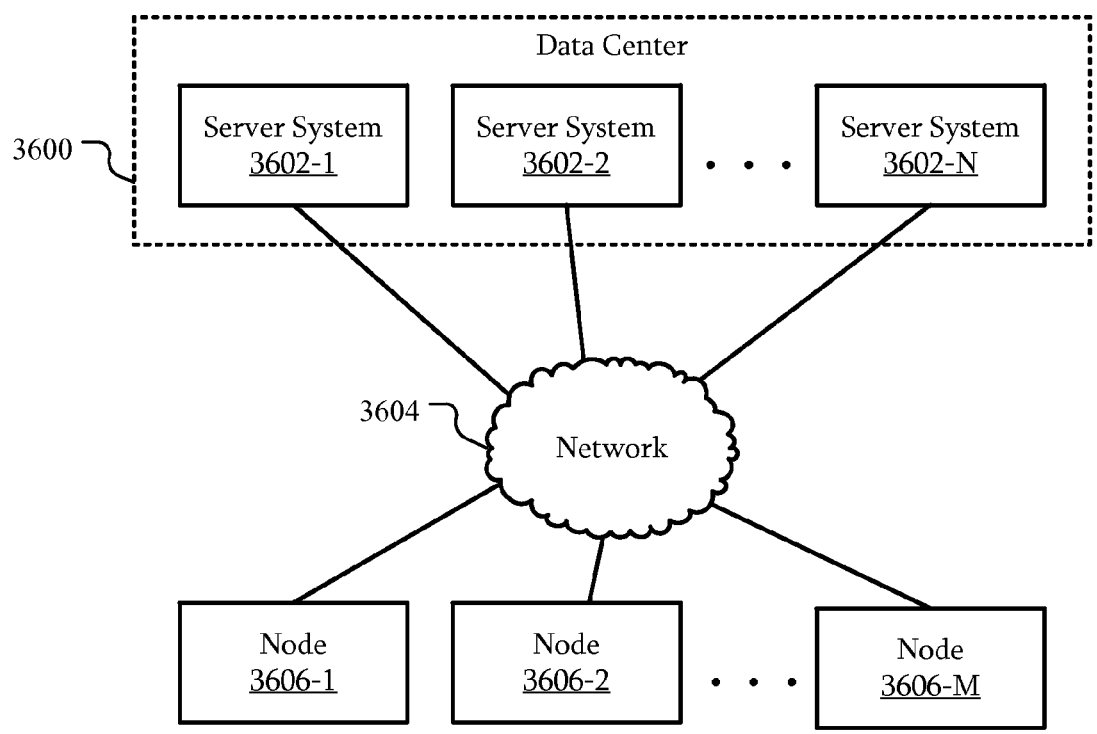
FIG. 36 is a schematic view of a data center according to an embodiment.

FIG. 36 is a schematic view of a data center according to an embodiment. In this embodiment, the data center 3600 includes multiple servers systems 3602-1 to 3602-N. The server systems 3602 may be similar to the server system 3400 described above in FIG. 34. The server systems 3602 are coupled to a network 3604, such as the Internet. Accordingly, the server systems 3602 may communicate through the network 3604 with various nodes 3606-1 to 3606-M. For example, the nodes 3606 may be client computers, other servers, remote data centers, storage systems, or the like.

An embodiment includes a system, comprising: an Error Correcting Code (ECC) memory comprising a plurality of memory locations, each memory location corresponding to a device address of the ECC memory; a system management bus (SMB); a baseboard management controller (BMC) coupled to the ECC memory through the SMB; and an operating system comprising a driver module coupled to the BMC through the SMB, the driver module being configured to receive through the Memory device address information associated with the ECC memory and to convert the device address information into physical address information independent of an ECC memory controller.

In an embodiment, the driver module comprises a device address to physical address (DA-to-PA) conversion table with which the driver module converts the device address information into physical address information.

An embodiment further comprises a processing device coupled to the ECC memory and a Basic Input/Output System (BIOS) for the system, and wherein the DA-to-PA conversion table is based on configuration information for the processing device and configuration information for the BIOS.

In an embodiment, the DA-to-PA conversion table is received by the driver module from a shell script during initialization of the driver module.

In an embodiment, the driver module is further configured to store the DA-to-PA conversion table within the driver module.

In an embodiment, the ECC memory comprises Single-Error Correcting, Double-Error Detection (SECDED) ECC memory, a single-chip Chipkill ECC memory or a double-chip Chipkill ECC memory.

In an embodiment, the system is part of a server system.

Another embodiment includes a system, comprising: a processing device comprising an error-correcting code (ECC) memory controller; an ECC memory coupled to the ECC memory controller of the processing device, the ECC memory comprising a plurality of memory locations, each memory location corresponding to a device address of the ECC memory; a system management bus (SMB); a baseboard management controller (BMC) coupled to the ECC memory through the SMB; and an operating system configured to manage the processing device, the operating system comprising a driver module coupled to the BMC through the SMB and bypassing the ECC memory controller of the processing device, the driver module being configured to receive through the Memory device address information associated with the ECC memory and to convert the address information into physical address information independent of the ECC memory controller.

In an embodiment, the driver module comprises a device address to physical address (DA-to-PA) conversion table with which the driver module converts the address information into physical address information.

In an embodiment, the DA-to-PA conversion table is based on configuration information for the processing device and configuration information for the Basic Input/Output System (BIOS) for the system.

In an embodiment, the DA-to-PA conversion table is received by the driver module from a shell script during initialization of the driver module.

In an embodiment, the driver module is further configured to store the DA-to-PA conversion table within the driver module.

In an embodiment, the ECC memory comprises Single-Error Correcting, Double-Error Detection (SECDED) ECC memory, a single-chip Chipkill ECC memory or a double-chip Chipkill ECC memory.

In an embodiment, the system is part of a server system.

Another embodiment includes a method, comprising: receiving at a driver module of an operation system kernel device address information for an Error Correction Code (ECC) memory from a system management bus (SMB), the ECC memory comprising a plurality of memory locations, and each memory location corresponding to a device address of the ECC memory; converting at the driver module the device address information into physical address information; and sending the physical address information to the operating system kernel.

In an embodiment, the driver module comprises a device address to physical address (DA-to-PA) conversion table, and converting the device address information into physical address information comprises reading the physical address information from the DA-to-PA conversion table for the received device address information.

In an embodiment, the DA-to-PA conversion table is based on configuration information for a processing device coupled to the memory system and configuration information for a Basic Input/Output System (BIOS) for the memory system.

An embodiment further comprises receiving the DA-to-PA conversion table by the driver module from a shell script during initialization of the driver module.

In an embodiment, the DA-to-PA conversion table is stored within the driver module.

Although the structures, methods, and systems have been described in accordance with exemplary embodiments, one of ordinary skill in the art will readily recognize that many variations to the disclosed embodiments are possible, and any variations should therefore be considered to be within the spirit and scope of the apparatus, method, and system disclosed herein. Accordingly, many modifications may be made by one of ordinary skill in the art without departing from the scope of the appended claims.

The invention claimed is:

1. A driver module for an operating system, comprising:
an interface configured to receive from a system management bus (SMB) device address information associated with an Error Correcting Code (ECC) memory, the ECC memory comprising a plurality of memory locations, each memory location corresponding to a device address of the ECC memory; and
an address converter configured to convert the device address information into physical address information independent of an ECC memory controller, the physical address information corresponding to a physical location of the device address information.

2. The driver module according to claim 1, further comprising a device address to physical address (DA to PA) conversion table with which the address converter converts the device address information into physical address information.

3. The driver module according to claim 2, wherein the DA to PA conversion table is based on configuration information for a processing device associated with the operating system and configuration information for a Basic Input/Output System (BIOS) associated with the operating system.

4. The driver module according to claim 3, wherein the DA to PA conversion table is received by the driver module from a shell script received from the BIOS during initialization of the driver module.

5. The driver module according to claim 4, wherein DA to PA conversion table is hard coded into the BIOS.

6. The driver module according to claim 1, wherein the ECC memory comprises a Single-Error Correcting, Double-Error Detection (SECDED) ECC memory, a single-chip Chipkill ECC memory or a double-chip Chipkill ECC memory.

7. The driver module according to claim 1, wherein the ECC memory operates in a single channel/dual asymmetric mode or a dual channel symmetric mode.

8. A driver module for an operating system, comprising:
an interface configured to receive from a baseboard management controller (BMC) device address information associated with an Error Correcting Code (ECC) memory, the ECC memory comprising a plurality of memory locations, each memory location corresponding to a device address of the ECC memory; and
an address converter configured to convert the device address information into physical address information independent of an ECC memory controller, the physical address information corresponding to a physical location of the device address information,
the driver module sending the physical address information of a converted device address to a kernel of the operating system.

9. The driver module according to claim 8, further comprising a device address to physical address (DA to PA) conversion table that the address converter uses to convert the device address information associated with the ECC memory into physical address information.

10. The driver module according to claim 9, wherein the DA to PA conversion table is based at least in part on configuration information for a Basic Input/Output System (BIOS) associated with the operating system.

11. The driver module according to claim 10, wherein the DA to PA conversion table is received by the driver module from a shell script received from the BIOS during initialization of the driver module.

12. The driver module according to claim 10, wherein the DA to PA conversion table is hard coded into the BIOS.

13. The driver module according to claim 8, wherein the ECC memory comprises a Single-Error Correcting, Double-Error Detection (SECDED) ECC memory, a single-chip Chipkill ECC memory or a double-chip Chipkill ECC memory.

14. The driver module according to claim 8, wherein the ECC memory operates in a single channel/dual asymmetric mode or a dual channel symmetric mode.

15. A method to convert devices addresses to physical addresses in a memory system, the method comprising:

receiving at a driver module of an operation system kernel device address information for an Error Correction Code (ECC) memory from a system management bus (SMB), the ECC memory comprising a plurality of memory locations, and each memory location corresponding to a device address of the ECC memory;

converting at the driver module the device address information into physical address information, the physical address information corresponding to a physical location of the device address information; and sending the physical address information to the operating system kernel.

16. The method according to claim 15, wherein the driver module comprises a device address to physical address (DA to PA) conversion table, and wherein converting the device address information into physical address information comprises reading the physical address information from the DA to PA conversion table for the received device address information.

17. The method according to claim 16, further comprising receiving the DA to PA conversion table by the driver module from a shell script received from the BIOS during initialization of the driver module.

18. The method according to claim 17, wherein DA to PA conversion table is hard coded into the BIOS.

19. The method according to claim 15, wherein the ECC memory comprises a Single-Error Correcting, Double-Error Detection (SECDED) ECC memory, a single-chip Chipkill ECC memory or a double-chip Chipkill ECC memory.

20. The method according to claim 15, wherein the ECC memory operates in a single channel/dual asymmetric mode or a dual channel symmetric mode.

* * * * *